United States Patent
Paschall et al.

(10) Patent No.: US 11,994,874 B1
(45) Date of Patent: May 28, 2024

(54) ADAPTIVE SAFETY SYSTEMS FOR AUTONOMOUS MOBILE ROBOTS

(71) Applicant: Amazon Technologies, Inc., Seattle, WA (US)

(72) Inventors: Stephen Charles Paschall, Cambridge, MA (US); Justin Croyle, Hampstead, NH (US)

(73) Assignee: Amazon Technologies, Inc., Seattle, WA (US)

( * ) Notice: Subject to any disclaimer, the term of this patent is extended or adjusted under 35 U.S.C. 154(b) by 195 days.

(21) Appl. No.: 17/211,378

(22) Filed: Mar. 24, 2021

(51) Int. Cl.
*G05D 1/00* (2006.01)

(52) U.S. Cl.
CPC .......... *G05D 1/0293* (2013.01); *G05D 1/0289* (2013.01); *G05D 1/0295* (2013.01); *G05D 1/0246* (2013.01)

(58) Field of Classification Search
CPC .. G05D 1/0293; G05D 1/0289; G05D 1/0295; G05D 1/0246
See application file for complete search history.

(56) References Cited

U.S. PATENT DOCUMENTS

| | | | |
|---|---|---|---|
| 2010/0256852 A1* | 10/2010 | Mudalige | G08G 1/164 701/24 |
| 2011/0238241 A1* | 9/2011 | Brady | B61L 25/025 701/19 |
| 2019/0160675 A1* | 5/2019 | Paschall, II | G05D 1/024 |

* cited by examiner

*Primary Examiner* — Vivek D Koppikar
*Assistant Examiner* — Jeffrey R Chalhoub
(74) *Attorney, Agent, or Firm* — Athorus, PLLC

(57) ABSTRACT

Autonomous mobile robots (AMRs) having adaptive safety systems may operate individually or as part of a convoy. During individual operations, an AMR may determine a safety zone and stop responsive to detecting an object within the safety zone. During convoy operations, an AMR may selectively mute a portion of the safety zone and allow a forward AMR of a convoy within the portion of the safety zone. In this manner, the adaptive safety systems may enable convoy operations of multiple AMRs with relatively greater density and greater speed, thereby improving speed and efficiency of AMR operations without negatively impacting safety.

19 Claims, 12 Drawing Sheets

ADAPTIVE SAFETY SYSTEMS FOR AUTONOMOUS MOBILE ROBOTS

BACKGROUND

Many companies may store, package, and ship items and/or groups of items from material handling facilities. For example, many companies may store various items in a material handling facility and ship items to various destinations (e.g., customers, stores) from the material handling facility. Various material handling systems and processes, including receipt, sorting, storage, packing, shipping, or other processing of items within a material handling facility, often incur significant cost and time. Accordingly, there is a need for flexible and automated systems and methods to facilitate the various material handling processes within a material handling facility, thereby improving the speed and efficiency of such processes.

DETAILED DESCRIPTION

Figure 1A:
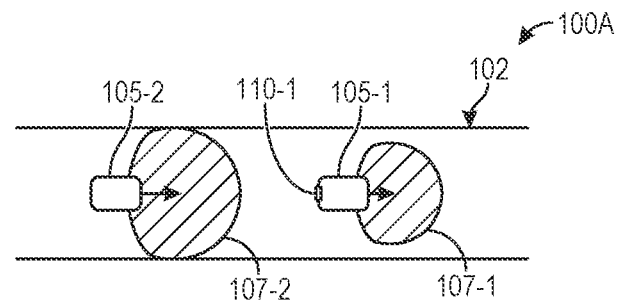
FIGS. 1A-1C are schematic diagrams of example autonomous mobile robots having adaptive safety systems to form and operate as a convoy, in accordance with implementations of the present disclosure.

As is set forth in greater detail below, implementations of the present disclosure are directed to autonomous mobile robots having adaptive safety systems to initiate, form, perform, adjust, and terminate convoy operations, and corresponding methods related to convoy operations.

In example embodiments, autonomous mobile robots described herein may be configured to operate safely in structured or unstructured areas, fields, or environments. In addition, the autonomous mobile robots may be configured to operate safely in proximity to various other types of autonomous robots, robotic devices, automated equipment or machinery, and/or human agents.

The autonomous mobile robots may transport various types of objects or items within a material handling facility. In other example embodiments, the autonomous mobile robots may operate within other environments, such as a warehouse, distribution center, sortation center, retail facility, wholesale facility, grocery store, or other types of environments. In order ensure safe operation of the autonomous mobile robots in structured or unstructured areas, as well as in proximity to various other types of robots, equipment, machinery, or humans, the autonomous mobile robots may include safety systems to detect objects in proximity to the autonomous mobile robots, and navigation systems in communication with the safety systems to ensure safe operations of the autonomous mobile robots. However, such safe operations may reduce the speed or efficiency of the autonomous mobile robots.

In example embodiments, the autonomous mobile robots described herein may include adaptive safety systems in communication with navigation systems that may allow or permit particular types of operations, e.g., convoy operations, in order to improve or increase the speed or efficiency of the autonomous mobile robots. In addition, the operations of the autonomous mobile robots may be improved without negatively impacting safety of such operations in structured or unstructured areas, as well as in proximity to various other types of robots, equipment, machinery, or humans.

Using the adaptive safety systems as further described herein to enable convoy operations, two or more autonomous mobile robots, e.g., including a leader autonomous mobile robot and one or more follower autonomous mobile robots, may travel in a group at relatively closer separation distances relative to each other and/or at relatively higher speeds as compared to individual or independent operations of the autonomous mobile robots. The one or more follower autonomous mobile robots may substantially continuously or intermittently detect the leader, or a preceding, autonomous mobile robot in order to maintain the convoy operations. In addition, various adjustments may be made to the convoy operations, such as modifying one or more movement characteristics, adding one or more autonomous mobile robots, removing one or more autonomous mobile robots, stopping one or more autonomous mobile robots, and/or various other types of adjustments.

Figure 1B:
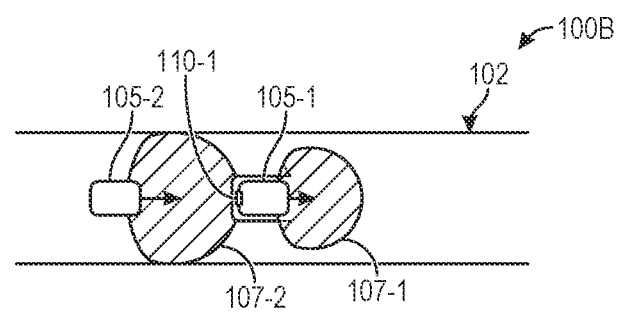
Figure 1C:
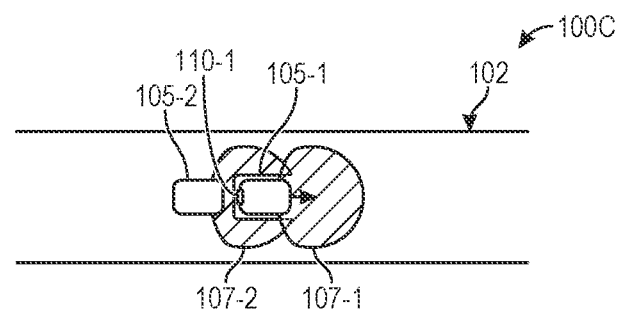

FIGS. 1A-1C are schematic diagrams 100A, 100B, 100C of example autonomous mobile robots having adaptive safety systems to form and operate as a convoy, in accordance with implementations of the present disclosure.

As shown in FIG. 1A, a first autonomous mobile robot (AMR) 105-1 and a second autonomous mobile robot (AMR) 105-2 may be traveling along a path 102 within an environment. In example embodiments, the first and second AMRs may navigate between various locations within the environment to receive, load, transport, and/or unload one or more items or objects. In addition, the first and second AMRs may navigate within structured areas or fields, e.g., areas having identifiers, codes, or other markings associated with various locations that aid navigation and location determination, or within unstructured areas or fields, e.g., areas without identifiers, codes, or other markings associated with various locations. As further described herein at least with respect to FIGS. 2 and 11, the first and second AMRs may include navigation systems, or navigation system controllers, to facilitate location determination and movement of the AMRs between various locations within the environment.

The first AMR 105-1 may include a safety system that detects objects or other AMRs in proximity to the first AMR 105-1. As further described herein at least with respect to FIGS. 2 and 11, the safety system, or safety system controller, may comprise one or more imaging sensors, light detection and ranging (LIDAR) sensors, radar sensors, proximity sensors, other types of time of flight sensors, RFID readers or sensors, or other types of sensors. The safety system may detect objects within a safety zone 107-1 that extends around at least a portion of a periphery of the first AMR 105-1, e.g., at least toward a forward movement direction of the first AMR 105-1.

The first AMR 105-1 may further include an identifier, code, or marking 110-1 that is positioned on or near a rearward portion of the first AMR 105-1. The identifier 110-1 may be positioned so as to be detected by a safety system of an AMR that may be following the first AMR 105-1. In example embodiments, the identifier 110-1 may comprise a sticker, label, identifier, code, text, characters, symbols, patterns, colors, barcodes, quick response (QR) codes, or other types of identifiers or markings. In further example embodiments, the identifier 110-1 may comprise a display, screen, or other presentation device that can dynamically present or display one or more codes or markings. In still further example embodiments, the identifier 110-1 may comprise a radiofrequency identification (RFID) tag, e.g., a directional RFID tag.

The second AMR 105-2 may also include a safety system that detects objects or other AMRs in proximity to the second AMR 105-2. As further described herein at least with respect to FIGS. 2 and 11, the safety system, or safety system controller, may comprise one or more imaging sensors, LIDAR sensors, radar sensors, proximity sensors, other types of time of flight sensors, RFID readers or sensors, or other types of sensors. The safety system may detect objects within a safety zone 107-2 that extends around at least a portion of a periphery of the second AMR 105-2, e.g., at least toward a forward movement direction of the second AMR 105-2.

The second AMR 105-2 may further include an identifier, code, or marking (not shown) that is positioned on or near a rearward portion of the second AMR 105-2. The identifier may be positioned so as to be detected by a safety system of an AMR that may be following the second AMR 105-2. In example embodiments, the identifier may comprise a sticker, label, identifier, code, text, characters, symbols, patterns, colors, barcodes, quick response (QR) codes, or other types of identifiers or markings. In further example embodiments, the identifier may comprise a display, screen, or other presentation device that can dynamically present or display one or more codes or markings. In still further example embodiments, the identifier may comprise a radiofrequency identification (RFID) tag, e.g., a directional RFID tag.

The safety zone 107 of an AMR 105 may be sized based on various factors associated with the AMR 105, such as type, capabilities, position, speed, acceleration, weight, load, other characteristics of the AMR, and/or various characteristics of the environment. For example, a size of a safety zone 107 may be directly related to a speed of the AMR 105, such that the safety zone 107 may be larger at higher speed and smaller at lower speed. In addition, a size of the safety zone 107 may be determined based on braking capabilities or braking distance of the AMR, weight and/or load of the AMR, slope or other surface characteristics of the environment within which the AMR is operating, and/or other characteristics. Further, a size, position, and/or orientation of the safety zone 107 may be determined based on angular speed, angular acceleration, a planned path, curve, or arc, or other characteristics related to movement of the AMR along a non-linear path. In such examples, the safety zone 107 may be positioned, oriented, or angled toward an angular movement direction of the AMR, and the size of the safety zone 107 may also be modified based on angular speed, acceleration, braking, or other related capabilities of the AMR. Generally, the size of the safety zone 107 may be determined such that if the AMR 105 detects an object within the safety zone 107, the AMR 105 may stop without contacting or impacting the detected object.

Figure 11:
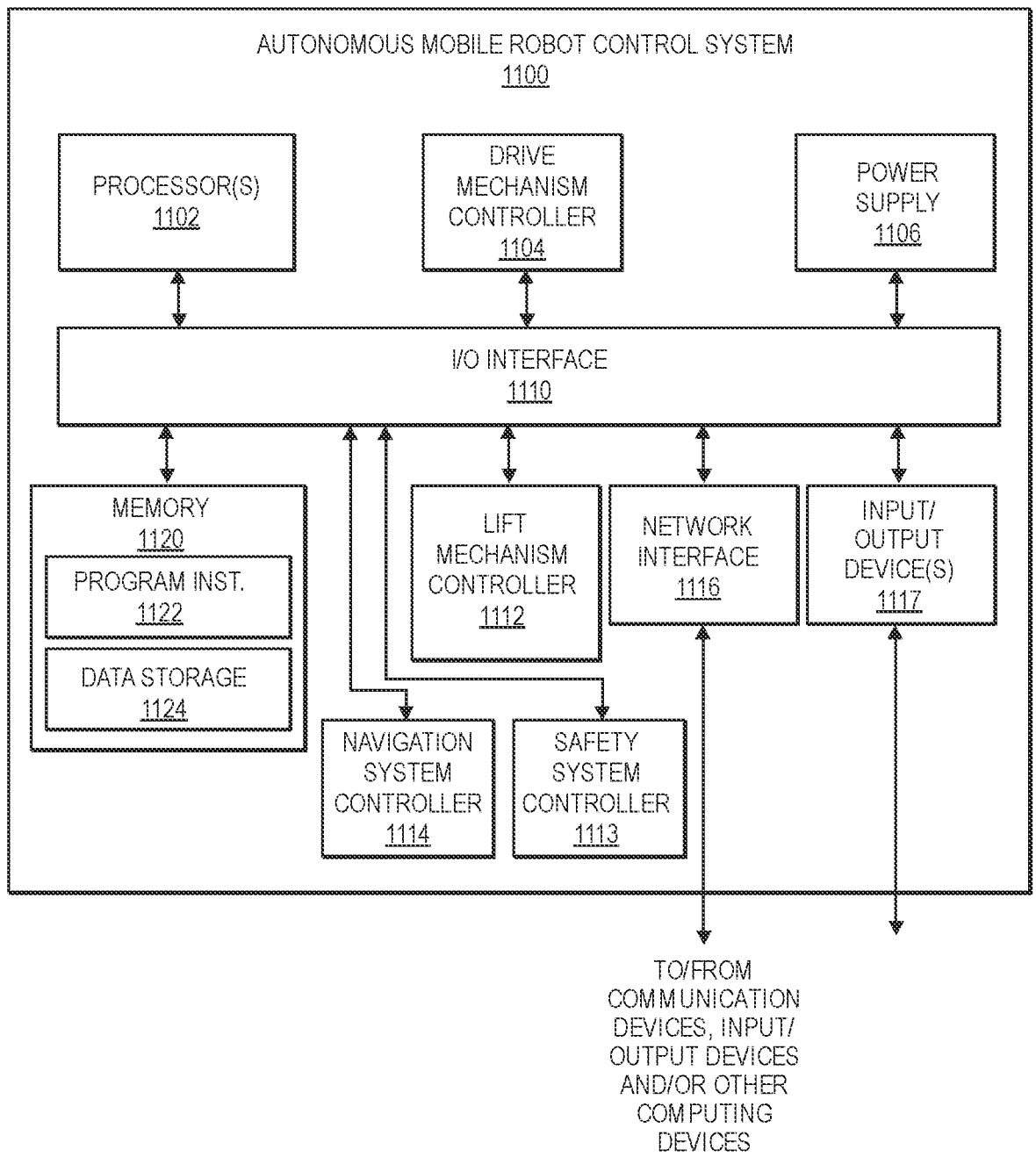
FIG. 11 is a block diagram illustrating various components of an example autonomous mobile robot control system, in accordance with implementations of the present disclosure.

The navigation system and safety system of each respective AMR 105 may be in communication with each other, as well as with other controllers, memory, sensors, components, or portions of the AMR 105, in order to ensure safe operations of the AMR 105, as further described herein at least with respect to FIG. 11. In addition, a plurality of AMRs 105 may be in communication with each other in order to coordinate and ensure safe operations among the plurality of AMRs 105, as further described herein at least with respect to FIG. 11. Further, each respective AMR 105 may be in communication with a control system, such as a material handling facility control system, sortation center control system, or other management control system, to receive and/or send data, information, and/or commands, as further described herein at least with respect to FIGS. 11 and 12.

As shown in FIG. 1A, a control system associated with a facility or environment may determine that the first and second AMRs 105-1, 105-2 can form a convoy and continue along path 102 toward respective destinations within the environment. In order to determine whether two or more AMRs can or should form a convoy, the control system may receive and/or process data related to identities, types, capabilities, positions, speeds, accelerations, weights, loads, planned paths, destinations, other characteristics of the AMRs, and/or various characteristics of the environment, such as slopes, surface characteristics, congestion, traffic, obstacles, availability of dedicated high speed transport lanes, or other characteristics of the environment. Based on an analysis of various factors associated with the two or more AMRs, as well as the environment in which the AMRs are operating, the control system may determine whether the AMRs can or should form a convoy to improve speed and efficiency of operations.

In addition, the control system may determine one or more movement characteristics associated with the AMRs 105-1, 105-2 in order to form the convoy. For example, the first AMR 105-1 may be instructed to reduce or modify speed, stop, maintain substantially straight movement, follow a particular path, and/or other modifications to movement characteristics. In addition, the second AMR 105-2 may be instructed to increase or modify speed, change direction, follow a particular path of the first AMR 105-1, and/or other modifications to movement characteristics. Various other types of movement characteristics may be determined for the AMRs that may form the convoy, and the movement characteristics for individual AMRs of the convoy may differ based on respective characteristics of individual AMRs, such as types, capabilities, braking distances, maximum speeds, maximum accelerations, weights, loads, or other characteristics. Further, the control system may instruct or command the first and second AMRs 105-1, 105-2 to form a convoy, and may also send instructions or commands related to modifications of one or more movement characteristics. In some example embodiments, the instructions to form a convoy may be explicit commands or instructions for the AMRs to form the convoy, whereas in other example embodiments, the instructions to form a convoy may be commands or instructions that may permit or allow the AMRs to opportunistically form the convoy in response to the AMRs detecting each other during respective operations.

Responsive to receiving instructions or commands from the control system, the first and second AMRs 105-1, 105-2 may modify one or more movement characteristics to form the convoy. In the example shown in FIG. 1A, the first AMR 105-1 may maintain speed, slow down, or stop, as schematically shown by the relatively smaller safety zone 107-1 in a forward movement direction of the first AMR 105-1. In addition, the first AMR 105-1 may maintain substantially straight movement along a particular path 102. Further, the second AMR 105-2 may maintain or increase speed, as schematically shown by the relatively larger safety zone 107-2 in a forward movement direction of the second AMR 105-2. In addition, the second AMR 105-2 may change direction in order to follow along the same particular path 102 as the first AMR 105-1.

During navigation of the first and second AMRs 105-1, 105-2 to form the convoy, the safety systems of each of the AMRs 105 may continue to sense and detect objects that may enter respective safety zones 107 of the AMRs 105. Generally, if an object is detected within a safety zone 107 of an AMR 105, the AMR 105 may stop, change direction, or otherwise modify one or more movement characteristics to prevent contact or impact with the detected object.

Furthermore, in order to form the convoy with the first and second AMRs 105-1, 105-2, the safety system of the second AMR 105-2 may also sense and detect an identifier 110-1 associated with the first AMR 105-1. As shown in FIG. 1B, the second AMR 105-2 may have navigated into proximity with the first AMR 105-1, such that the identifier 110-1 of the first AMR 105-1 may be detected and identified within the safety zone 107-2 of the second AMR 105-2.

Based on the instructions or commands from the control system to form a convoy, detection and identification of the identifier 110-1 of the first AMR 105-1 within the safety zone 107-2 of the second AMR 105-2 may not cause the second AMR 105-2 to stop, change direction, or otherwise modify one or more movement characteristics to prevent contact or impact with the first AMR 105-1. Instead, the safety system of the second AMR 105-2 may selectively mute a portion of the safety zone 107-2 in order to allow or permit a portion of the first AMR 105-1 within the safety zone 107-2, as long as the identifier 110-1 of the first AMR 105-1 continues to be present and detected within the safety zone 107-2. However, even with this muting of a portion of the safety zone 107-2, the second AMR 105-2 may generally maintain a defined separation distance from the first AMR 105-1 such that if the first AMR 105-1 detects an object within the safety zone 107-1 and stops, the second AMR 105-2 may also stop without contacting or impacting the first AMR 105-1.

Then, as shown in FIG. 1C, the navigation system of the first AMR 105-1 may modify one or more movement characteristics to form the convoy with the second AMR 105-2. For example, the first AMR 105-1 may maintain or modify speed, make smooth or gradual turns or curves, and continue movement along the particular path 102. Further, the navigation system of the second AMR 105-2 may modify one or more movement characteristics to form the convoy with the first AMR 105-1. For example, the second AMR 105-2 may modify speed to substantially match a speed of the first AMR 105-1, maintain position and defined separation distance behind the first AMR 105-1, and continue movement along the particular path 102 behind the first AMR 105-1.

The convoy formed with first and second AMRs 105-1, 105-2 may then navigate substantially as a group or line of AMRs 105 in order to increase speed and efficiency of transport operations. For example, the convoy of AMRs may move with relatively greater speed than a speed of individually or independently operating AMRs. The convoy of AMRs may also move together as a group with relatively smaller separation distances between individual AMRs of the convoy than corresponding separation distances between individually or independently operating AMRs. In addition, the convoy of AMRs may make smooth or gradual turns, curves, starts, stops, or various other modifications to movement characteristics. Further, the convoy of AMRs may move along particular paths or lanes within an environment that may be dedicated or intended for convoy operations, and may generally have fewer obstacles, crossing traffic, or other potential interruptions to movement.

The adaptive safety systems of AMRs described herein may selectively mute portions of safety zones associated with respective AMRs to enable convoy operations, and may enable such convoy operations for groups of AMRs at higher speed and/or with greater density, in order to increase speed and efficiency of transport operations within various environments.

Figure 2:
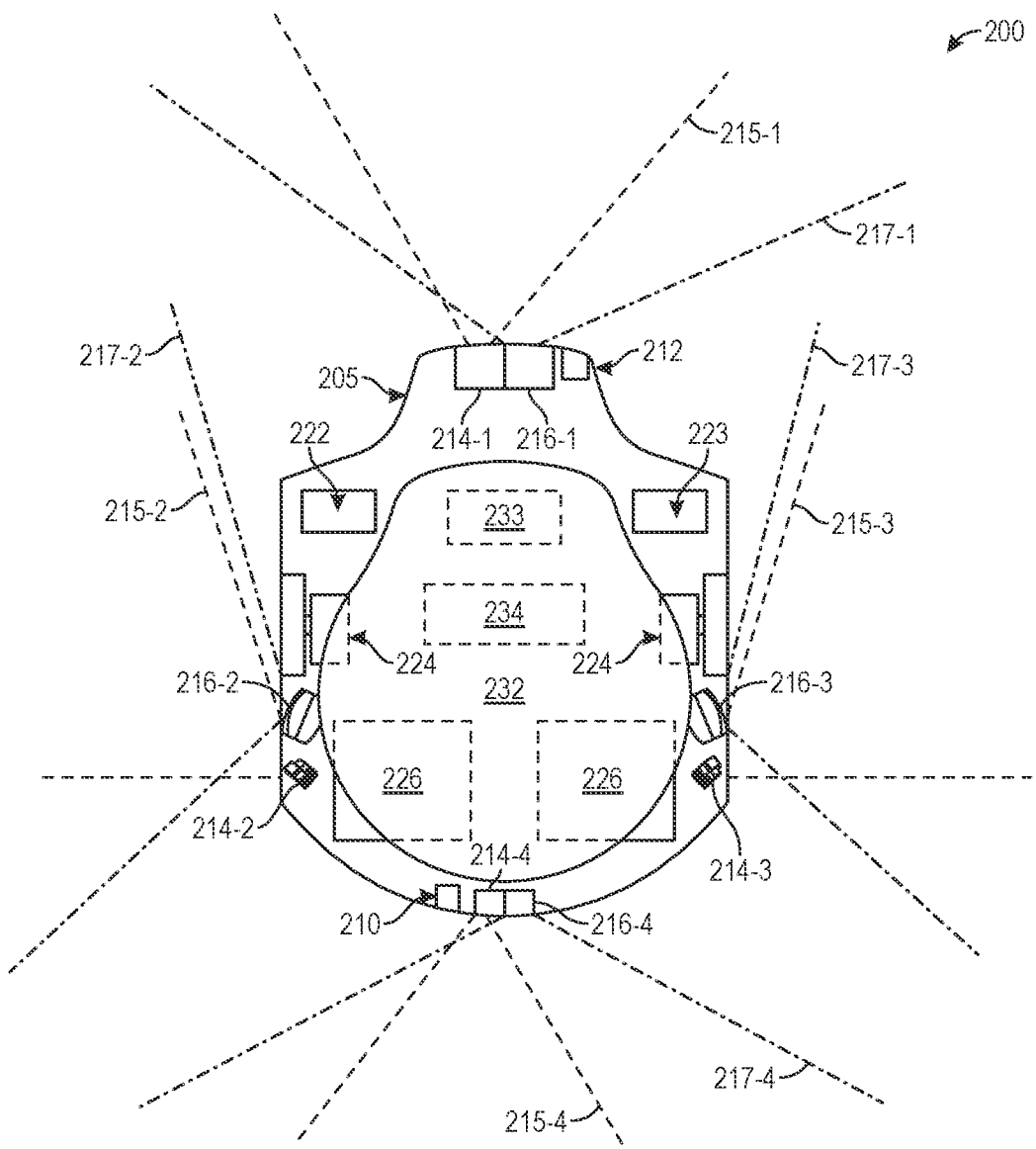
FIG. 2 is a schematic diagram of an example autonomous mobile robot having an adaptive safety system, in accordance with implementations of the present disclosure.

FIG. 2 is a schematic diagram 200 of an example autonomous mobile robot having an adaptive safety system, in accordance with implementations of the present disclosure. The example AMRs described in various example embodiments herein may include any and all of the features shown and described at least with respect to the example AMR of FIG. 2.

As shown in FIG. 2, the example AMR 205 may include an identifier 210 positioned on or near a rearward portion of the AMR 205, a safety system comprising a plurality of sensors 214, 216 having respective fields of view 215, 217, a controller or processor 222, a memory 223, drive mechanism controllers 224, power supplies 226, a lift mechanism controller 232, a safety system controller 233, and a navigation system controller 234. In additional example embodiments, the AMR 205 may also include an additional identifier 212 positioned on or near a forward portion of the AMR 205.

The identifier, code, or marking 210 that is on or near a rearward portion of the AMR 205 may be positioned so as to be detected by a safety system of another AMR that may be following the AMR 205. In example embodiments, the identifier 210 may comprise a sticker, label, identifier, code, text, characters, symbols, patterns, colors, barcodes, quick response (QR) codes, or other types of identifiers or markings. In further example embodiments, the identifier 210 may comprise a display, screen, or other presentation device that can dynamically present or display one or more codes or markings. In still further example embodiments, the identifier 210 may comprise a radiofrequency identification (RFID) tag, e.g., a directional RFID tag. The identifier 210 may encode an identity, type, capabilities, weight, load, position, speed, acceleration, planned path, and/or various other characteristics associated with the AMR 205.

The safety system may comprise one or more imaging sensors, light detection and ranging (LIDAR) sensors, radar sensors, proximity sensors, other types of time of flight sensors, RFID readers or sensors, or other types of sensors. For example, the safety system may comprise a plurality of imaging sensors 214 and a plurality of LIDAR sensors 216. As shown in FIG. 2, a first imaging sensor 214-1 may have a first field of view 215-1 directed toward a forward movement direction of the AMR 205, a second imaging sensor 214-2 may have a second field of view 215-2 directed toward a left side of the AMR 205, a third imaging sensor 214-3 may have a third field of view 215-3 directed toward a right side of the AMR 205, and a fourth imaging sensor 214-4 may have a fourth field of view 215-4 directed toward a rearward movement direction of the AMR 205.

Similarly, as shown in FIG. 2, a first LIDAR sensor 216-1 may have a first field of view 217-1 directed toward a forward movement direction of the AMR 205, a second LIDAR sensor 216-2 may have a second field of view 217-2 directed toward a left side of the AMR 205, a third LIDAR sensor 216-3 may have a third field of view 217-3 directed toward a right side of the AMR 205, and a fourth LIDAR sensor 216-4 may have a fourth field of view 217-4 directed toward a rearward movement direction of the AMR 205.

The safety system may create or generate a safety zone around at least a portion of a periphery of the AMR 205 based on the fields of view 215, 217 of the plurality of sensors 214, 216. For example, the safety zone may extend substantially 360 degrees around a periphery of the AMR 205. In other examples, the safety zone may extend substantially only in a forward movement direction of the AMR 205. In further examples, the safety zone may extend in a forward movement direction and at least partially along right and/or left sides of the AMR 205. Further, the fields of view 215, 217 of the plurality of sensors 214, 216 may include a vertical range to detect objects with greater height, overhanging objects, overhead machines, equipment, or obstacles, or various other types of objects.

The safety zone of an AMR 205 may be sized based on various factors associated with the AMR 205, such as type, capabilities, position, speed, acceleration, weight, load, other characteristics of the AMR, and/or various characteristics of the environment. For example, a size of a safety zone, e.g., in a forward movement direction, may be directly related to a speed of the AMR, such that the safety zone may be larger at higher speed and smaller at lower speed. In addition, a size of the safety zone, e.g., in a forward movement direction, may be determined based on braking capabilities or braking distance of the AMR, weight and/or load of the AMR, slope or other surface characteristics of the environment within which the AMR is operating, and/or other characteristics. Generally, the size of the safety zone may be determined such that if the AMR 205 detects an object within the safety zone, the AMR 205 may stop without contacting or impacting the detected object.

In addition, identifiers 210, 212 of other AMRs may be detected by one or more of the plurality of sensors 214, 216 of the safety system of the AMR 205. For example, during convoy operations as described herein, a first imaging sensor 214-1 and/or a first LIDAR sensor 216-1 of the AMR 205 may detect an identifier of a forward AMR that the AMR 205 is following, and the identifier 210 that is on or near a rearward portion of the AMR 205 may be detected by one or more sensors of a rearward AMR that is following the AMR 205. In additional example embodiments, during convoy operations as described herein, one or more sensors of a forward AMR that the AMR 205 is following may detect the identifier 212 that is on or near a forward portion of the AMR 205, and a fourth imaging sensor 214-4 and/or a fourth LIDAR sensor 216-4 of the AMR 205 may detect an identifier of a rearward AMR that is following the AMR 205. Using additional identifiers 212 that may be detected by one or more sensors of a forward AMR and/or using one or more sensors 214, 216 to detect identifiers of a rearward AMR may enable further communication and confirmation between multiple AMRs, and/or by a control system, that two or more AMRs are engaged in convoy operations as instructed or commanded.

In addition to detecting objects, obstacles, and/or identifiers associated with AMRs, the plurality of sensors 214, 216 of the safety system of the AMR 205 may also detect distances to identifiers associated with AMRs. For example, various types of range determination or time of flight sensors may be used to detect distances to detected identifiers associated with AMRs. In addition, various imaging sensors may capture imaging data of identifiers associated with AMRs, and size or dimensions of detected identifiers may be compared with known size or dimensions of identifiers in order to detect distances to the detected identifiers, which may be further based on image capture characteristics associated with the imaging sensors. In further example embodiments, stereo or multiple imaging devices, cameras, or sensors may be used to detect and determine distances to detected identifiers associated with AMRs.

The controller or processor 222 may receive, process, analyze, and/or transmit data, information, instructions, and/or commands associated with operations of the AMR 205. The memory 223 may store data, information, instructions, and/or commands associated with operations of the AMR 205. In addition, the drive mechanism controllers 224 may receive, process, and/or analyze instructions or commands associated with drive operations of the AMR 205, and may transmit instructions or commands to actuators, motors, wheels, or various other types of propulsion mechanisms that may cause movement of the AMR 205. Further, the power supplies 226 may comprise batteries or other types of power storage devices, and may provide power to various components of the AMR 205. Moreover, the controller 222, memory 223, drive mechanism controllers 224, and power supplies 226 may be in communication with each other, as well as with other components of the AMR 205 described herein, in order to control and coordinate operations of the AMR 205.

In some example embodiments, the AMR 205 may include a lift mechanism controller 232 and corresponding lifting plate, surface, or elements that are configured to couple to and lift an object, such as a container, shelves, inventory storage pod, or other types of objects. For example, the AMR 205 may move under an object, e.g., under an inventory storage pod, and the lift mechanism controller 232 may instruct the lifting plate to couple to and lift the object. In other example embodiments, the lift mechanism controller 232 may couple the lifting plate or one or more elements, such as hooks, arms, clamps, or other connecting elements, to the object and then push or pull the object, e.g., using wheels or rollers associated with the object. In still further example embodiments, the AMR 205 may include other modular attachments or components on top of or in place of the lifting plate to load, transport, and unload objects, such as trays, bins, containers, receptacles, conveyor sections, robotic arms, or other components. In yet further example embodiments, the AMR 205 may not include a lift mechanism controller 232 and may instead be configured to load, transport, and unload objects to and from an upper surface, tray, bin, container, receptacle, or other portion of the AMR 205.

The safety system controller 233 may receive data from the plurality of sensors 214, 216 related to detected objects, obstacles, other AMRs, and/or identifiers associated with AMRs. In addition, the safety system controller 233 may receive data from other components of the AMR 205 and/or a control system within the environment, e.g., related to type, capabilities, position, speed, acceleration, weight, load, other characteristics of the AMR, and/or various characteristics of the environment.

Based on the received data, the safety system controller 233 may process the data associated with detected objects, which may include transposing the data to a desired coordinate system, filtering the data, voxelizing the data, and creating an occupancy grid. The occupancy grid may indicate positions, e.g., positions within three-dimensional space, of detected objects relative to the AMR 205, and/or relative to sensors of the AMR 205 that detected the objects.

In addition, the safety system controller 233 may process the data related to type, capabilities, position, speed, acceleration, weight, load, other characteristics of the AMR, and/or various characteristics of the environment to determine size, dimensions, range, positions, orientations, or other characteristics of a safety zone around at least a portion of the periphery of the AMR 205. Generally, a safety zone may be defined that is within or smaller than maximum sensing ranges or distances of the plurality of sensors of the AMR 205. Further, the safety zone may change dynamically with changing operations of the AMR 205, including different positions or locations, directions, speeds, accelerations, weights, loads, or other characteristics.

Then, the safety system controller 233 may process or compare the occupancy grid with the safety zone to determine whether one or more objects, or portions thereof, are detected within the safety zone. Generally, during individual or independent operations of an AMR 205, if an object or a portion thereof is detected within the safety zone, the AMR 205 may stop, change direction, or otherwise modify one or more movement characteristics to prevent contact or impact with the detected object.

During convoy operations of multiple AMRs 205 as further described herein, portions of safety zones may be selectively muted to allow or permit portions of AMRs within the safety zones, in order to improve speed and efficiency of movement and transport operations. For example, selective muting of a portion of a safety zone may comprise allowing or permitting a violation of the safety zone by a particular portion of a forward AMR, e.g., a rearward portion of the forward AMR having a detected identifier. The selective muting may temporarily or dynamically allow this violation of the safety zone, as long as the detected identifier of the forward AMR remains within the field of view of one or more sensors of the safety system. In addition, the one or more sensors that detect the identifier of the forward AMR within the safety zone may be operated at a higher sampling rate or frequency to substantially continuously or intermittently detect the identifier of the forward AMR, and thereby ensure safe convoy operations while following the forward AMR.

Further, during convoy operations, the selective muting of a portion of a safety zone may comprise determining a size or dimensions of the muted portion of the safety zone to maintain a defined separation distance between adjacent AMRs of the convoy. The defined separation distance may be determined based on data related to type, capabilities, position, speed, acceleration, weight, load, other characteristics of the AMRs, and/or various characteristics of the environment, in order to ensure that each respective AMR of the convoy may stop without contacting or impacting any other AMRs of the convoy. Further, the defined separation distance associated with the selective muting of the portion of the safety zone may also change dynamically with changing operations of the AMR 205, including different positions or locations, directions, speeds, accelerations, weights, loads, or other characteristics.

The navigation system controller 234 may be in communication with the controller 222, memory 223, drive mechanism controllers 224, power supplies 226, and safety system controller 233, as well as other components described herein, in order to control movement of the AMR 205 within an environment. For example, the navigation system controller 234 may receive data or information from the controller 222, memory 223, the drive mechanism controllers 224, or other sensors or components related to type, capabilities, position, speed, acceleration, weight, load, other characteristics of the AMR, and/or various characteristics of the environment. In addition, the navigation system controller 234 may include or be in communication with one or more position or location determination sensors or systems, such as global positioning system (GPS) sensors, indoor positioning system sensors, or other types of location determination sensors. Generally, during individual or independent operations of an AMR 205, the navigation system controller 234 may instruct or command movement or transport operations of the AMR 205 to perform various tasks.

In addition, the navigation system controller 234 may receive data or information from the safety system controller 233 related to one or more objects detected within a safety zone of the AMR 205. Based on the received data, the navigation system controller 234 may instruct or command modifications to one or more movement characteristics of the AMR 205 to prevent contact or impact with detected objects. Further, in combination with selective muting of a portion of a safety zone by the safety system controller 233 of an AMR 205 based on the received data to enable convoy operations, the navigation system controller 234 may instruct or command movement or transport operations of the AMR 205 to form, operate, adjust, or terminate convoy operations as further described herein.

Further details of various components of the AMR 205, including the controller 222, memory 223, drive mechanism controllers 224, power supplies 226, lift mechanism controller 232, safety system controller 233, and navigation system controller 234 are described herein at least with respect to FIG. 11.

Although FIG. 2 illustrates a particular number, type, configuration, or arrangement of components, other example embodiments may include various other numbers, types, configurations, or arrangements of components. For example, other types of sensors may be included in the safety system, one or more sensors may be positioned in different positions and with different orientations, one or more identifiers may be positioned in different positions and with different orientations, and/or various components may be modified, combined, or omitted in other example embodiments of autonomous mobile robots.

Figure 3A:
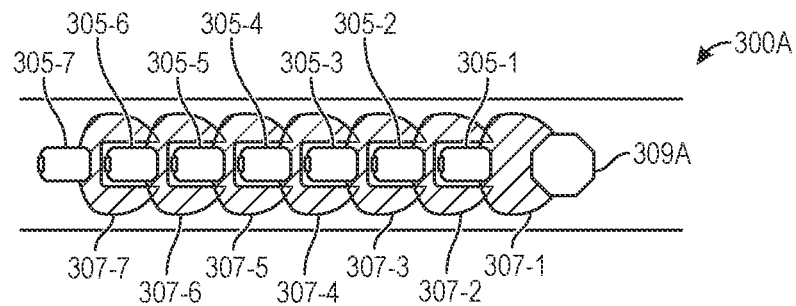
FIGS. 3A-3C are schematic diagrams of example autonomous mobile robots having adaptive safety systems to operate and adjust as a convoy, in accordance with implementations of the present disclosure.
Figure 3B:
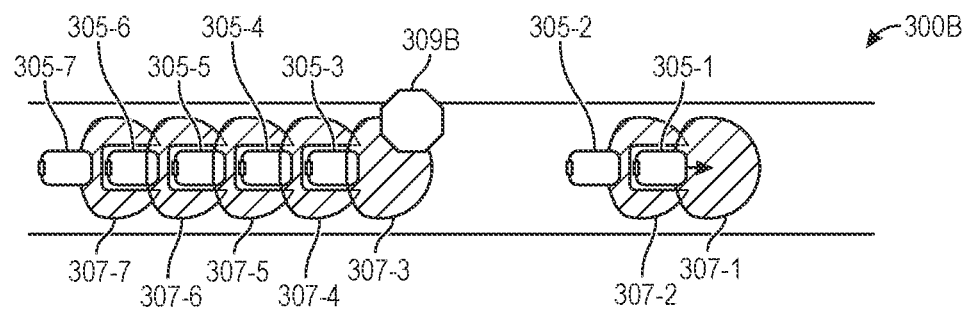
Figure 3C:
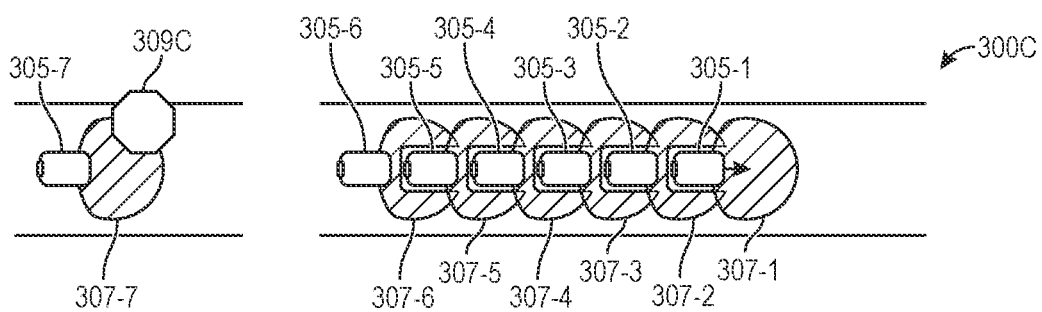

FIGS. 3A-3C are schematic diagrams 300A, 300B, 300C of example autonomous mobile robots having adaptive safety systems to operate and adjust as a convoy, in accordance with implementations of the present disclosure.

As shown in FIGS. 3A-3C, a group of AMRs 305 may have formed and be traveling as a convoy. For example, as described at least with respect to FIGS. 1A-1C, a control system may have determined that two or more of the AMRs 305-1, 305-2, 305-3, 305-4, 305-5, 305-6, 305-7 having respective safety zones 307-1, 307-2, 307-3, 307-4, 307-5, 307-6, 307-7 may form a convoy with one or more movement characteristics, and the control system may then have instructed the AMRs 305 to modify respective movement characteristics to form the convoy.

During convoy operations, a first, or leader, AMR 305 may modify one or more movement characteristics to operate as a leader of the convoy, e.g., modify speed, direction, or path. Then, each following AMR 305 may substantially or continuously detect an identifier associated with a leader or preceding AMR 305, and each following AMR 305 may selectively mute a portion of a respective safety zone 307 to allow or permit a portion of the leader or preceding AMR 305 within the portion of the respective safety zone 307. Further, each following AMR 305 may also modify one or more movement characteristics to operate as part of the convoy, e.g., modify speed, direction, or path to match speeds and/or maintain defined separation distances.

For example, with reference to FIG. 3A, a safety system of a first AMR 305-1 may have an associated safety zone 307-1 that is not selectively muted during its operations as a leader of the convoy, in order to detect objects, obstacles, or other AMRs in a path of the convoy. Then, a safety system of a second AMR 305-2 may have an associated safety zone 307-2 that is selectively muted to allow a portion of the first AMR 305-1 within the safety zone 307-2 as long as an identifier of the first AMR 305-1 continues to be detected by the safety system of the second AMR 305-2, a safety system of a third AMR 305-3 may have an associated safety zone 307-3 that is selectively muted to allow a portion of the second AMR 305-2 within the safety zone 307-3 as long as an identifier of the second AMR 305-2 continues to be detected by the safety system of the third AMR 305-3, a safety system of a fourth AMR 305-4 may have an associated safety zone 307-4 that is selectively muted to allow a portion of the third AMR 305-3 within the safety zone 307-4 as long as an identifier of the third AMR 305-3 continues to be detected by the safety system of the fourth AMR 305-4, and so on.

During convoy operations, various adjustments may be made to the operations of one or more AMRs 305. For example, as shown in FIGS. 3A-3C, one or more AMRs 305 of the convoy may stop, slow, or interrupt convoy operations, in response to detecting an object or obstacle within a respective safety zone 307 of the one or more AMRs 305.

As shown in FIG. 3A, during convoy operations, a first AMR 305-1 may detect an object or obstacle 309A within a safety zone 307-1 of the first AMR 305-1. As a result, the first AMR 305-1 may slow or stop to prevent contact or impact with the detected object 309A. Then, the remaining AMRs 305-2, 305-3, 305-4, 305-5, 305-6, 305-7 of the convoy may also slow or stop in corresponding manner in response to the movement changes of the first AMR 305-1.

In some example embodiments, all AMRs 305 of the convoy may stop and wait for the object 309A to no longer be detected within the safety zone 307-1 of the first AMR 305-1, such that the convoy may resume operations. In other example embodiments, the first AMR 305-1 and the entire convoy may slow down and/or reroute around the detected object 309A, and then continue operations as the convoy. In other example embodiments, the first AMR 305-1 may slow or stop, and one or more of the remaining AMRs may leave the convoy and reroute around the first AMR 305-1 and detected object 309A, and then continue operations as another convoy. In embodiments in which one or more AMRs leave or separate from the convoy, the remaining AMRs may reroute and wait for other AMRs to rejoin the convoy, and then continue operations as a reformed or reconfigured convoy.

As shown in FIG. 3B, during convoy operations, a third AMR 305-3 may detect an object or obstacle 309B within a safety zone 307-3 of the third AMR 305-3. As a result, the third AMR 305-3 may slow or stop to prevent contact or impact with the detected object 309B. Then, the remaining AMRs 305-4, 305-5, 305-6, 305-7 of the convoy may also slow or stop in corresponding manner in response to the movement changes of the third AMR 305-3. In addition, the first and second AMRs 305-1, 305-2 may continue operations as a reconfigured convoy without the remaining AMRs. Further, when the safety system of the third AMR 305-3 detects the object 309B and/or no longer detects the identifier of the preceding AMR 305-2, the safety system may end or stop the selective muting of the safety zone 307-3 of the third AMR 305-3 to ensure safe operations of the third AMR 305-3 and any following AMRs.

In some example embodiments, all AMRs 305 of the convoy may stop and wait for the object 309B to no longer be detected within the safety zone 307-3 of the third AMR 305-3, such that the convoy may resume operations. In other example embodiments, the third AMR 305-3 and the remaining convoy may slow down and/or reroute around the detected object 309B, and then continue operations as another convoy. In other example embodiments, the third AMR 305-3 may slow or stop, and one or more of the remaining AMRs may leave the convoy and reroute around the third AMR 305-3 and detected object 309B, and then continue operations as another convoy. In embodiments in which one or more AMRs leave or separate from the convoy, the remaining AMRs may reroute and wait for other AMRs to rejoin the convoy, and then continue operations as a reformed or reconfigured convoy.

As shown in FIG. 3C, during convoy operations, a seventh AMR 305-7 may detect an object or obstacle 309C within a safety zone 307-7 of the seventh AMR 305-7. As a result, the seventh AMR 305-7 may slow or stop to prevent contact or impact with the detected object 309C. In addition, the remaining AMRs 305-1, 305-2, 305-3, 305-4, 305-5, 305-6 may continue operations as a reconfigured convoy without the seventh AMR 305-7. Further, when the safety system of the seventh AMR 305-7 detects the object 309C and/or no longer detects the identifier of the preceding AMR 305-6, the safety system may end or stop the selective muting of the safety zone 307-7 of the seventh AMR 305-7 to ensure safe operations of the seventh AMR 305-7 individually.

In some example embodiments, all AMRs 305 of the convoy may stop and wait for the object 309C to no longer be detected within the safety zone 307-7 of the seventh AMR 305-7, such that the convoy may resume operations. In other example embodiments, the seventh AMR 305-7 may slow down and/or reroute around the detected object 309C, and then continue operations individually. In embodiments in which one or more AMRs leave or separate from the convoy, the remaining AMRs may reroute and wait for other AMRs to rejoin the convoy, and then continue operations as a reformed or reconfigured convoy.

Figure 4A:
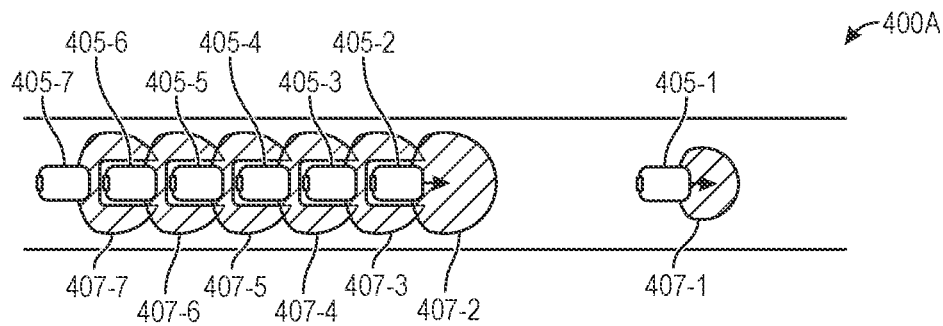
FIGS. 4A-4C are schematic diagrams of example autonomous mobile robots having adaptive safety systems to operate and adjust as a convoy, in accordance with implementations of the present disclosure.
Figure 4B:
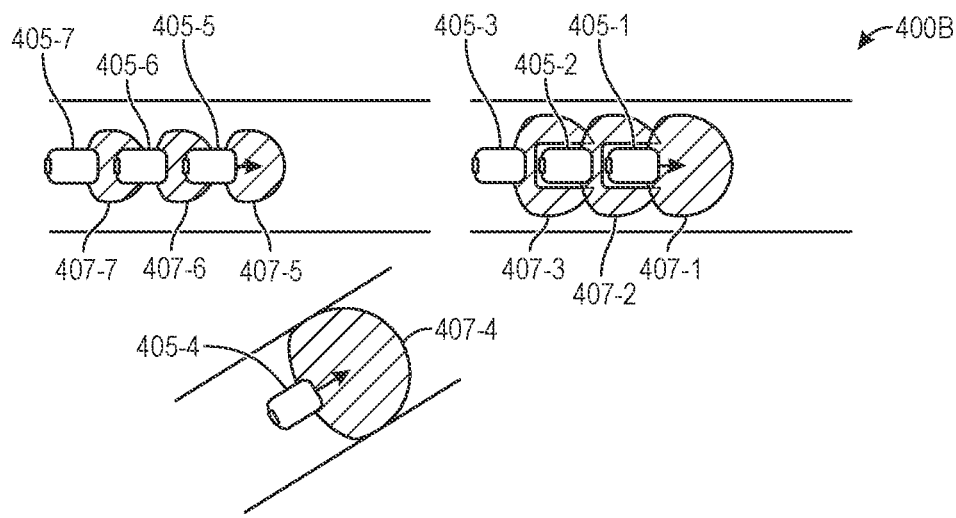
Figure 4C:
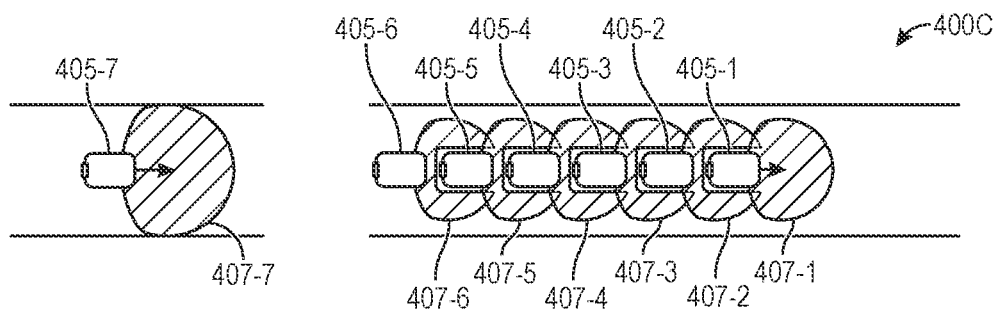

FIGS. 4A-4C are schematic diagrams 400A, 400B, 400C of example autonomous mobile robots having adaptive safety systems to operate and adjust as a convoy, in accordance with implementations of the present disclosure.

As shown in FIGS. 4A-4C, a group of AMRs 405 may have formed and be traveling as a convoy. For example, as described at least with respect to FIGS. 1A-1C, a control system may have determined that two or more of the AMRs 405-1, 405-2, 405-3, 405-4, 405-5, 405-6, 405-7 may form a convoy with one or more movement characteristics, and the control system may then have instructed the AMRs 405 to modify respective movement characteristics to form the convoy.

During convoy operations, a first, or leader, AMR 405 may modify one or more movement characteristics to operate as a leader of the convoy, e.g., modify speed, direction, or path. Then, each following AMR 405 may substantially or continuously detect an identifier associated with a leader or preceding AMR 405, and each following AMR 405 may selectively mute a portion of a respective safety zone 407 to allow or permit a portion of the leader or preceding AMR 405 within the portion of the respective safety zone 407. Further, each following AMR 405 may also modify one or more movement characteristics to operate as part of the convoy, e.g., modify speed, direction, or path to match speeds and/or maintain defined separation distances.

For example, with reference to FIG. 4C, a safety system of a first AMR 405-1 may have an associated safety zone 407-1 that is not selectively muted during its operations as a leader of the convoy, in order to detect objects, obstacles, or other AMRs in a path of the convoy. Then, a safety system of a second AMR 405-2 may have an associated safety zone 407-2 that is selectively muted to allow a portion of the first AMR 405-1 within the safety zone 407-2 as long as an identifier of the first AMR 405-1 continues to be detected by the safety system of the second AMR 405-2, a safety system of a third AMR 405-3 may have an associated safety zone 407-3 that is selectively muted to allow a portion of the second AMR 405-2 within the safety zone 407-3 as long as an identifier of the second AMR 405-2 continues to be detected by the safety system of the third AMR 405-3, a safety system of a fourth AMR 405-4 may have an associated safety zone 407-4 that is selectively muted to allow a portion of the third AMR 405-3 within the safety zone 407-4 as long as an identifier of the third AMR 405-3 continues to be detected by the safety system of the fourth AMR 405-4, and so on.

During convoy operations, various adjustments may be made to the operations of one or more AMRs 405. For example, as shown in FIGS. 4A-4C, one or more AMRs 405 may join or combine with an existing convoy to modify or adjust convoy operations.

As shown in FIG. 4A, during convoy operations, an existing convoy may include AMRs 405-2, 405-3, 405-4, 405-5, 405-6, 405-7, and a new first AMR 405-1 may be added as a new leader of the existing convoy. As a result, the new first AMR 405-1 may slow, stop, and/or wait for the existing convoy to catch up and form behind it, as indicated by the smaller safety zone 407-1 associated with the new first AMR 405-1. In addition, the AMRs of the existing convoy may continue or speed up to align and catch up to the new first AMR 405-1, as indicated by the larger safety zones 407-2, 407-3, 407-4, 407-5, 407-6, 407-7 associated with the AMRs 405 of the existing convoy. Further, when the safety system of the second AMR 405-2 detects the identifier of the new first AMR 405-1, the safety system of the second AMR 405-2 may begin or initiate selective muting of the safety zone 407-2 of the second AMR 405-2 to follow and enable convoy operations with the new first AMR 405-1.

As shown in FIG. 4B, during convoy operations, an existing convoy may include AMRs 405-1, 405-2, 405-3, 405-5, 405-6, 405-7, and a new fourth AMR 405-4 may be added as part of the existing convoy. As a result, the existing convoy may split or separate such that a first group of AMRs 405-1, 405-2, 405-3 separates from a second group of AMRs 405-5, 405-6, 405-7. The first group may continue or speed up, as indicated by the larger safety zones 407-1, 407-2, 407-3 associated with the first group of AMRs, and the second group may slow or stop, as indicated by the smaller safety zones 407-5, 407-6, 407-7 associated with the second group of AMRs. In addition, the new fourth AMR 405-4 may continue or speed up to align and catch up to the first group of AMRs, as indicated by the larger safety zone 407-4 associated with the new fourth AMR 405-4. Further, when the safety system of the new fourth AMR 405-4 detects the identifier of the third AMR 405-3, the safety system of the new fourth AMR 405-4 may begin or initiate selective muting of the safety zone 407-4 of the new fourth AMR 405-4 to follow and enable convoy operations with the first group of AMRs. Moreover, the second group of AMRs may reform a convoy with the first group of AMRs including the new fourth AMR 405-4, and when the safety system of the fifth AMR 405-5 detects the identifier of the new fourth AMR 405-4, the safety system of the fifth AMR 405-5 may begin or initiate selective muting of the safety zone 407-5 of the fifth AMR 405-5 to follow and enable convoy operations with the first group of AMRs including the new fourth AMR 405-4.

As shown in FIG. 4C, during convoy operations, an existing convoy may include AMRs 405-1, 405-2, 405-3, 405-4, 405-5, 405-6, and a new seventh AMR 405-7 may be added as a new follower of the existing convoy. As a result, the existing convoy of AMRs may slow, stop, and/or wait for the new seventh AMR 405-7 to catch up and form behind it, as indicated by the smaller safety zones 407-1, 407-2, 407-3, 407-4, 407-5, 407-6 associated with the existing convoy of AMRs. In addition, the new seventh AMR 405-7 may continue or speed up to align and catch up to the existing convoy, as indicated by the larger safety zone 407-7 associated with the new seventh AMR 405-7. Further, when the safety system of the new seventh AMR 405-7 detects the identifier of the sixth AMR 405-6 of the existing convoy, the safety system of the new seventh AMR 405-7 may begin or initiate selective muting of the safety zone 407-7 of the new seventh AMR 405-7 to follow and enable convoy operations with the existing convoy of AMRs.

Figure 5A:
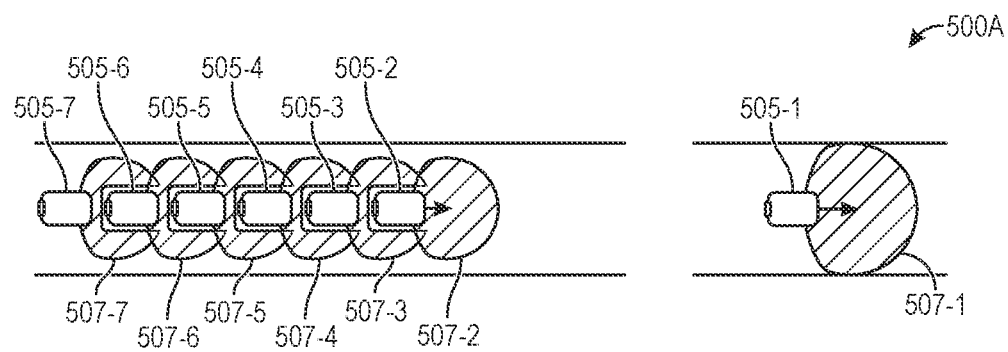
FIGS. 5A-5C are schematic diagrams of example autonomous mobile robots having adaptive safety systems to operate and adjust as a convoy, in accordance with implementations of the present disclosure.
Figure 5B:
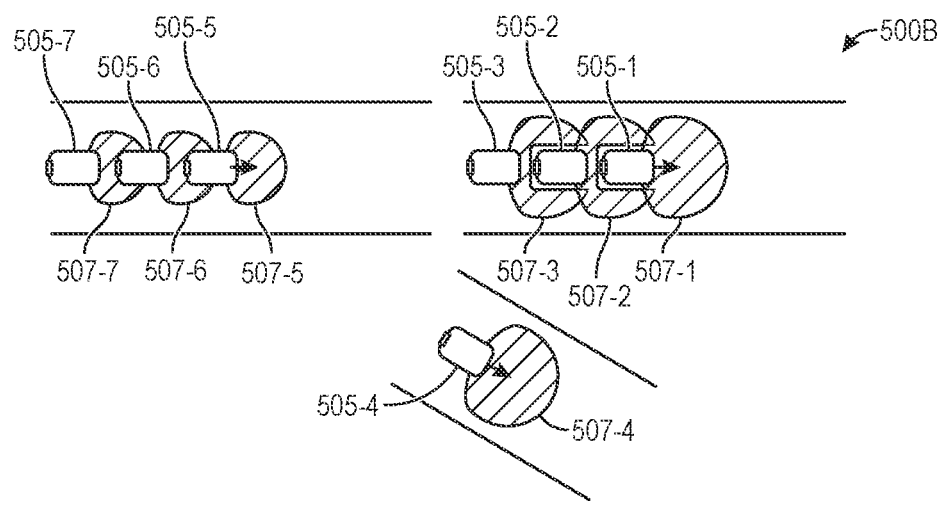
Figure 5C:
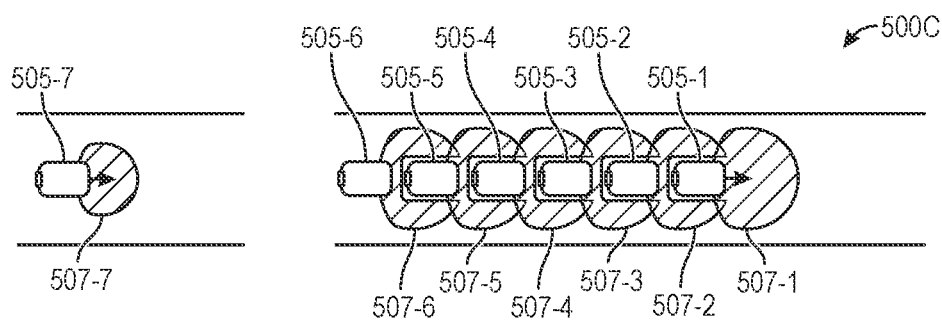

FIGS. 5A-5C are schematic diagrams 500A, 500B, 500C of example autonomous mobile robots having adaptive safety systems to operate and adjust as a convoy, in accordance with implementations of the present disclosure.

As shown in FIGS. 5A-5C, a group of AMRs 505 may have formed and be traveling as a convoy. For example, as described at least with respect to FIGS. 1A-1C, a control system may have determined that two or more of the AMRs 505-1, 505-2, 505-3, 505-4, 505-5, 505-6, 505-7 may form a convoy with one or more movement characteristics, and the control system may then have instructed the AMRs 505 to modify respective movement characteristics to form the convoy.

During convoy operations, a first, or leader, AMR 505 may modify one or more movement characteristics to operate as a leader of the convoy, e.g., modify speed, direction, or path. Then, each following AMR 505 may substantially or continuously detect an identifier associated with a leader or preceding AMR 505, and each following AMR 505 may selectively mute a portion of a respective safety zone 507 to allow or permit a portion of the leader or preceding AMR 505 within the portion of the respective safety zone 507. Further, each following AMR 505 may also modify one or more movement characteristics to operate as part of the convoy, e.g., modify speed, direction, or path to match speeds and/or maintain defined separation distances.

For example, with reference to FIG. 5C, a safety system of a first AMR 505-1 may have an associated safety zone 507-1 that is not selectively muted during its operations as a leader of the convoy, in order to detect objects, obstacles, or other AMRs in a path of the convoy. Then, a safety system of a second AMR 505-2 may have an associated safety zone 507-2 that is selectively muted to allow a portion of the first AMR 505-1 within the safety zone 507-2 as long as an identifier of the first AMR 505-1 continues to be detected by the safety system of the second AMR 505-2, a safety system of a third AMR 505-3 may have an associated safety zone 507-3 that is selectively muted to allow a portion of the second AMR 505-2 within the safety zone 507-3 as long as an identifier of the second AMR 505-2 continues to be detected by the safety system of the third AMR 505-3, a safety system of a fourth AMR 505-4 may have an associated safety zone 507-4 that is selectively muted to allow a portion of the third AMR 505-3 within the safety zone 507-4 as long as an identifier of the third AMR 505-3 continues to be detected by the safety system of the fourth AMR 505-4, and so on.

During convoy operations, various adjustments may be made to the operations of one or more AMRs 505. For example, as shown in FIGS. 5A-5C, one or more AMRs 505 may split or separate from an existing convoy to modify or adjust convoy operations.

As shown in FIG. 5A, during convoy operations, an existing convoy may include AMRs 505-1, 505-2, 505-3, 505-4, 505-5, 505-6, 505-7, and a first, or leader, AMR 505-1 may split or separate from the existing convoy. As a result, the first AMR 505-1 may continue or speed up to separate from the existing convoy behind it, as indicated by the larger safety zone 507-1 associated with the first AMR 505-1. In addition, the remaining AMRs of the existing convoy may continue, slow, or stop to separate from the first AMR 505-1, as indicated by the smaller safety zones 507-2, 507-3, 507-4, 507-5, 507-6, 507-7 associated with the remaining AMRs 505 of the existing convoy. Further, when the safety system of the second AMR 505-2 no longer detects the identifier of the first AMR 505-1, the safety system of the second AMR 505-2 may end or stop selective muting of the safety zone 507-2 of the second AMR 505-2, and the second AMR 505-2 may modify one or more movement characteristics to operate as the new leader of the remaining convoy.

As shown in FIG. 5B, during convoy operations, an existing convoy may include AMRs 505-1, 505-2, 505-3, 505-4, 505-5, 505-6, 505-7, and a fourth AMR 505-4 may split or separate from the existing convoy. As a result, the existing convoy may split or separate such that a first group of AMRs 505-1, 505-2, 505-3 separates from a second group of AMRs 505-5, 505-6, 505-7, and the fourth AMR 505-4 separates from the first and second groups of AMRs. The first group may continue or speed up, as indicated by the larger safety zones 507-1, 507-2, 507-3 associated with the first group of AMRs, and the second group may slow or stop, as indicated by the smaller safety zones 507-5, 507-6, 507-7 associated with the second group of AMRs. In addition, the fourth AMR 505-4 may continue, slow down, or speed up to separate from the first and second groups of AMRs, as indicated by the safety zone 507-4 associated with the fourth AMR 505-4. Further, when the safety system of the fourth AMR 505-4 no longer detects the identifier of the third AMR 505-3, the safety system of the fourth AMR 505-4 may end or stop selective muting of the safety zone 507-4 of the fourth AMR 505-4 to enable individual operations of the fourth AMR 505-4. Likewise, when the safety system of the fifth AMR 505-5 no longer detects the identifier of the fourth AMR 505-4, the safety system of the fifth AMR 505-5 may end or stop selective muting of the safety zone 507-5 of the fifth AMR 505-5 in order to operate as a new leader of the second group of AMRs. Moreover, the second group of AMRs may reform a convoy with the first group of AMRs without the fourth AMR 505-4, and when the safety system of the fifth AMR 505-5 detects the identifier of the third AMR 505-3, the safety system of the fifth AMR 505-5 may begin or initiate selective muting of the safety zone 507-5 of the fifth AMR 505-5 to follow and enable convoy operations with the first group of AMRs without the fourth AMR 505-4.

As shown in FIG. 5C, during convoy operations, an existing convoy may include AMRs 505-1, 505-2, 505-3, 505-4, 505-5, 505-6, 505-7, and a seventh, or last, AMR 505-7 may split or separate from the existing convoy. As a result, the seventh AMR 505-7 may slow or stop to separate from the existing convoy ahead, as indicated by the smaller safety zone 507-7 associated with the seventh AMR 505-7. In addition, the remaining AMRs of the existing convoy may continue or speed up to separate from the seventh AMR 505-7, as indicated by the larger safety zones 507-1, 507-2, 507-3, 507-4, 507-5, 507-6 associated with the remaining AMRs of the existing convoy. Further, when the safety system of the seventh AMR 505-7 no longer detects the identifier of the sixth AMR 505-6 of the existing convoy, the safety system of the seventh AMR 505-7 may end or stop selective muting of the safety zone 507-7 of the seventh AMR 505-7 to enable individual operations of the seventh AMR 505-7.

Various other types of adjustments to convoy operations may be possible in addition to those shown and described at least with respect to FIGS. 3A-5C. For example, other types of adjustments may include various additions, subtractions, reorderings, reconfigurations, combinations, mergings, separations, splits, disbandings, other modifications, or combinations thereof with respect to one or more AMRs and/or one or more convoys of AMRs.

Figure 6:
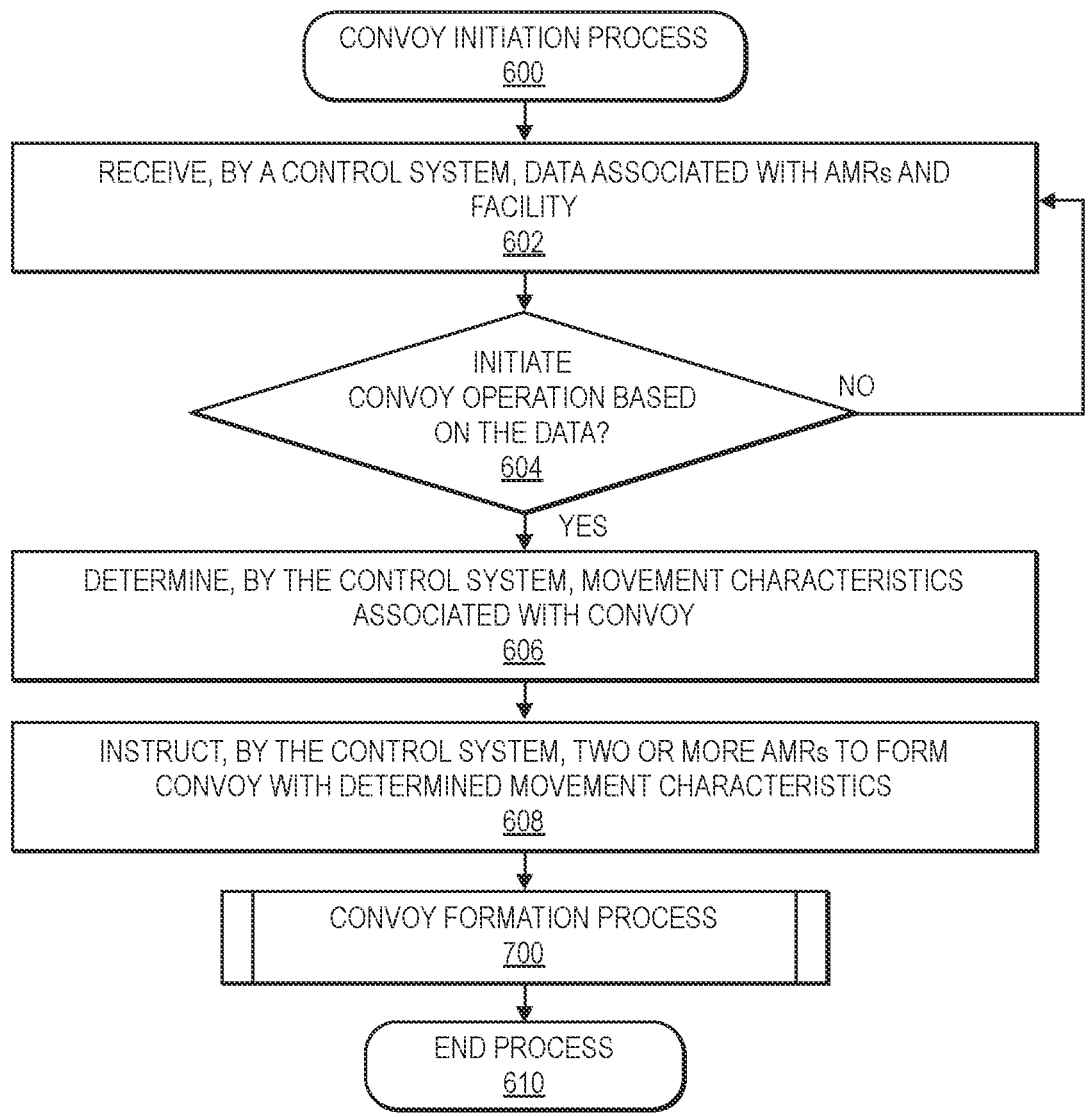
FIG. 6 is a flow diagram illustrating an example convoy initiation process, in accordance with implementations of the present disclosure.

FIG. 6 is a flow diagram illustrating an example convoy initiation process 600, in accordance with implementations of the present disclosure.

The process 600 may begin by receiving, by a control system, data associated with AMRs and a facility, as at 602. For example, the data associated with AMRs may comprise identities, types, capabilities, positions, speeds, accelerations, weights, loads, planned paths, destinations, or other characteristics of the AMRs. In addition, the data associated with a facility or environment may comprise slopes, surface characteristics, congestion, traffic, obstacles, availability of dedicated high speed transport lanes, or other characteristics of the environment. Further, the control system may receive the data associated with AMRs and the facility from various sources, including one or more AMRs, other control systems, a facility or management control system, or other data sources.

The process 600 may continue by determining whether to initiate convoy operations based on the data, as at 604. For example, the control system may process the data associated with AMRs and the facility to determine whether two or more AMRs can or should form a convoy to improve speed or efficiency of transport operations. In some example embodiments, if two or more AMRs are of similar types, the control system may determine that the AMRs should form a convoy. In further example embodiments, if two or more AMRs have similar capabilities, speeds, accelerations, or other operational characteristics, the control system may determine that the AMRs should form a convoy. In other example embodiments, if two or more AMRs have planned paths that are similar or the same for greater than a threshold distance, the control system may determine that the AMRs should form a convoy. In additional example embodiments, if two or more AMRs have destinations that are within a threshold proximity to each other, the control system may determine that the AMRs should form a convoy. In yet further example embodiments, if the facility is congested or full of obstacles, the control system may determine that the AMRs should form a convoy and utilize a dedicated high speed transport lane. Further, the control system may determine whether two or more AMRs should initiate convoy operations.

If it is determined that two or more AMRs should not initiate convoy operations, the process 600 may return to step 602, and continue to receive data associated with AMRs and the facility, and current operations associated therewith, and then again determine whether convoy operations should be initiated for two or more AMRs at a subsequent or later time.

If, however, it is determined that two or more AMRs should initiate convoy operations, then the process 600 may proceed by determining, by the control system, movement characteristics associated with the convoy, as at 606. For example, the one or more movement characteristics may include modifying speed, stopping, accelerating, decelerating, changing direction, turning, adjusting a path, rerouting, maintaining defined separation distances, and/or other modifications to movement characteristics. In some example embodiments, a convoy of two or more AMRs may travel as a group or line with greater speed and/or greater density than individually or independently operating AMRs. In additional example embodiments, a convoy of AMRs may make smooth or gradual turns, curves, or other changes to movement, and/or may utilize one or more dedicated high speed transport lanes. Further, the control system may determine that two or more AMRs should initiate convoy operations with determined movement characteristics.

The process 600 may then continue to instruct, by the control system, two or more AMRs to form the convoy with the determined movement characteristics, as at 608. For example, the two or more AMRs may be instructed or commanded to form the convoy and continue as a group or line of AMRs with the determined movement characteristics. In some example embodiments, the AMRs may be explicitly commanded to form a convoy with each other, whereas in other example embodiments, the AMRs may be allowed or permitted to opportunistically form a convoy with each other if the AMRs detect and identify each other during their respective operations. In addition, each individual AMR of the two or more AMRs may receive data or information, e.g., identifiers or codes, associated with a particular AMR immediately forward and/or a particular AMR immediately rearward of the AMR that are to form the convoy. In further example embodiments, one or more AMRs to form a convoy may receive data or information, e.g., identifiers or codes, associated with a subset, or substantially all, of the AMRs that are to form the convoy. Further, the control system may instruct or command the two or more AMRs to form a convoy with the determined movement characteristics.

The process 600 may then proceed with the convoy formation process, as at 700. For example, the two or more AMRs may form a convoy based on the instructions or commands from the control system that enable or command the AMRs to form the convoy with the determined movement characteristics. Further details of the convoy formation process 700 are described herein at least with respect to FIG. 7.

The process 600 may then end, as at 610.

Figure 7:
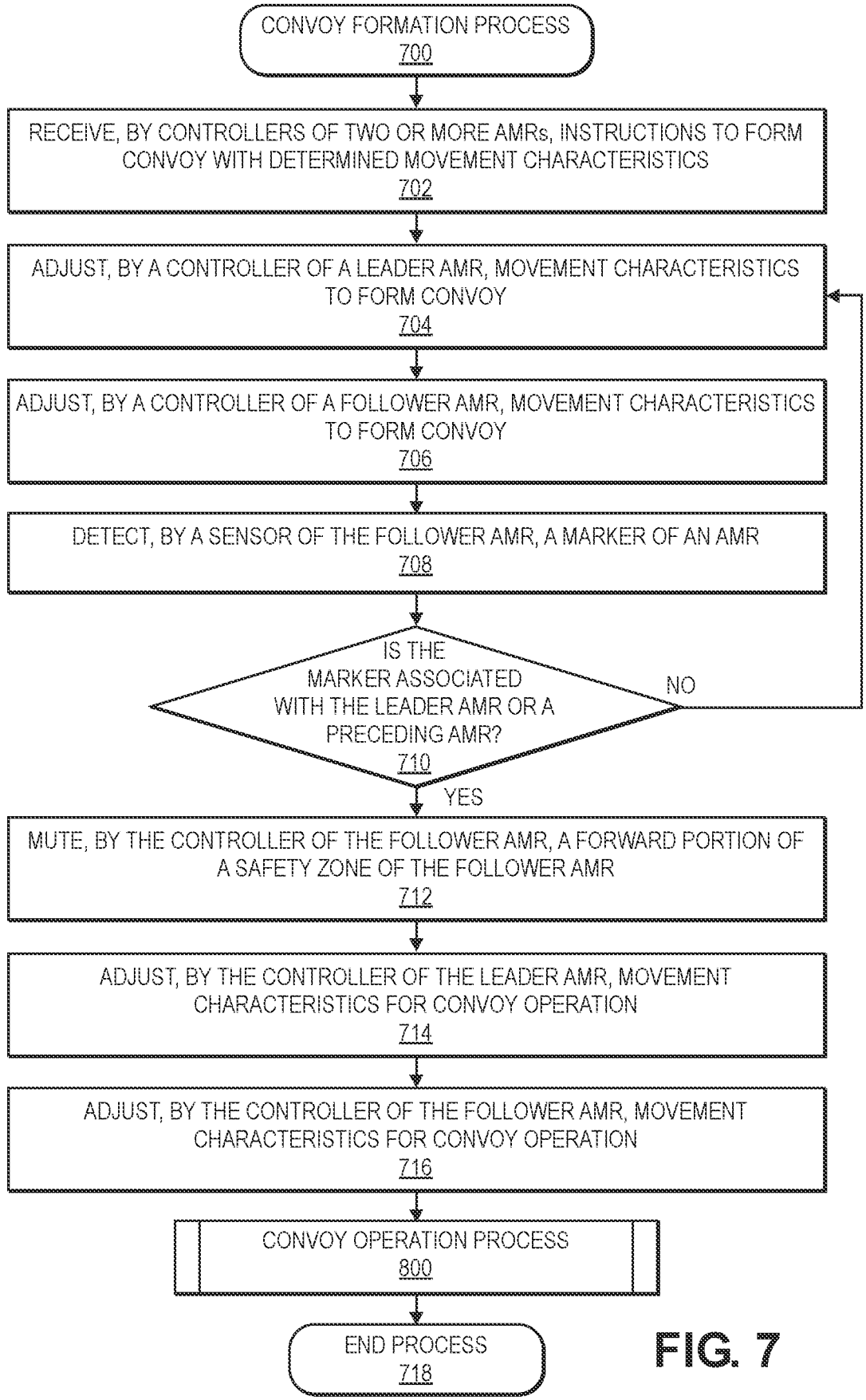
FIG. 7 is a flow diagram illustrating an example convoy formation process, in accordance with implementations of the present disclosure.

FIG. 7 is a flow diagram illustrating an example convoy formation process 700, in accordance with implementations of the present disclosure.

The process 700 may begin by receiving, by controllers of two or more AMRs, instructions to form a convoy with determined movement characteristics, as at 702. For example, as described at least with respect to FIG. 6, a control system may have determined that the two or more AMRs can or should form a convoy. In addition, the control system may have also determined movement characteristics for the AMRs that can or should form a convoy. Moreover, the control system may send or transmit instructions or commands to the AMRs to form the convoy with the determined movement characteristics, as well as data or information, e.g., identifier or codes, associated one or more other AMRs that are to form the convoy. Further, respective controllers of the two or more AMRs may receive the instructions or commands from the control system.

The process 700 may continue by adjusting, by a controller of a leader AMR, movement characteristics to form the convoy, as at 704. For example, based on the received instructions to form a convoy with one or more other AMRs, one AMR may be designated or instructed to operate as a leader AMR, e.g., an AMR that is expected to travel at a front or lead of the group or line of AMRs. Then, the leader AMR may modify one or more movement characteristics in order to facilitate formation of the convoy that will follow the leader AMR. For example, the one or more movement characteristics may include modifying speed, stopping, accelerating, decelerating, changing direction, turning, adjusting a path, rerouting, maintaining defined separation distances, and/or other modifications to movement characteristics. In some example embodiments, a leader AMR may slow or stop in order to allow one or more follower AMRs to catch up to and follow the leader AMR. In addition, a leader AMR may change direction or reroute in order to lead the convoy of AMRs along a particular path toward one or more destinations. Further, the controller of the leader AMR may adjust the movement characteristics of the leader AMR to facilitate formation of the convoy.

The process 700 may then proceed by adjusting, by a controller of a follower AMR, movement characteristics to form the convoy, as at 706. For example, based on the received instructions to form a convoy with one or more other AMRs, one or more AMRs may be designated or instructed to operate as a follower AMR, e.g., an AMR that is expected to travel with the group or line of AMRs and behind the leader or a preceding AMR of the group. Then, the follower AMR may modify one or more movement characteristics in order to facilitate formation of the convoy behind or with the leader AMR. For example, the one or more movement characteristics may include modifying speed, stopping, accelerating, decelerating, changing direction, turning, adjusting a path, rerouting, maintaining defined separation distances, and/or other modifications to movement characteristics. In some example embodiments, a follower AMR may maintain or increase speed in order to catch up to and follow the leader or preceding AMR. In addition, a follower AMR may change direction or reroute in order to travel along a same path as the leader or preceding AMR toward one or more destinations. Further, the controllers of the one or more follower AMRs may adjust the movement characteristics of the follower AMRs to facilitate formation of the convoy behind or with the leader AMR.

In addition, each follower AMR may receive data or information associated with the leader or preceding AMR that the follower AMR is to detect, identify, and follow. For example, the follower AMR may receive data associated with the identifier or code positioned on or near a rearward portion of the leader or preceding AMR that the follower AMR is to follow. Then, the controllers of the AMRs, and the control system, may confirm and communicate correct or desired formation of the convoy based on detection and identification of identifiers or codes of forward AMRs within the convoy. In some example embodiments, the follower AMR may also receive other data associated with the leader or preceding AMR, or any of the other AMRs that will form the convoy, and such other data may include identities, types, capabilities, positions, speeds, accelerations, weights, loads, planned paths, destinations, or other characteristics of the other AMRs. In additional example embodiments, one or more AMRs, e.g., a leader AMR and one or more follower AMRs except the last follower AMR, may also receive data associated with an identifier or code positioned on or near a forward portion of a rearward AMR that is following the AMR. The controllers of the AMRs, and the control system, may further confirm and communicate correct or desired formation of the convoy based on detection and identification of identifiers or codes of rearward AMRs within the convoy.

The process 700 may continue to detect, by a sensor of the follower AMR, a marker of an AMR, as at 708. For example, safety systems of the one or more follower AMRs may detect, via one or more sensors, identifiers or codes positioned on or near rearward portions of the leader or preceding AMRs. The one or more sensors of each AMR may include one or more imaging sensors, LIDAR sensors, radar sensors, proximity sensors, other types of time of flight sensors, RFID readers or sensors, or other types of sensors. For each follower AMR, the one or more sensors may detect an identifier or code associated with a leader or preceding AMR that the follower AMR has detected within a field of view of the one or more sensors. Further, the controller of the follower AMR may receive and process the data detected by the one or more sensors to identify an identifier or code associated with an AMR.

The process 700 may proceed to determine whether the marker is associated with a leader AMR or a preceding AMR, as at 710. For example, the identifier or code detected by the one or more sensors of a follower AMR may be identified. Then, the detected identifier may be compared with data associated with an expected identifier or code of the leader or preceding AMR that the follower AMR is instructed to follow. Further, the controller of the follower AMR may identify and compare the detected identifier with the expected identifier of the leader or preceding AMR that the follower AMR is instructed to follow. If the detected identifier does not match the expected identifier that the follower AMR is to identify and follow, then the process 700 may return to step 704, or steps 706 or 708, to continue operations to form the convoy and attempt to detect the correct AMR that the follower AMR is to follow.

If, however, the detected identifier does match the expected identifier that the follower AMR is to identify and follow, then the process 700 may continue with muting, by the controller of the follower AMR, a forward portion of a safety zone of the follower AMR, as at 712. For example, a portion of the safety zone of the follower AMR may be selectively muted to permit or allow a portion of the leader or preceding AMR, and its associated identifier, within the portion of the safety zone, e.g., toward a forward movement direction of the follower AMR. The selective muting may comprise a control or software modification to permit or allow a violation of the portion of the safety zone, as long as the identifier of the leader or preceding AMR continues to be detected within the portion of the safety zone. In addition, the one or more sensors may detect the identifier of the leader or preceding AMR at a higher sampling rate or frequency, in order to ensure that the identifier of the leader or preceding AMR continues to be detected, such that the selective muting should continue. Moreover, the selective muting may maintain a defined separation distance between the follower AMR and the leader or preceding AMR, e.g., based on various characteristics of the AMRs, in order to prevent contact or impact between the AMRs. Further, the controller of the follower AMR may selectively mute the portion of the safety zone to enable convoy operations with greater speed and/or greater density among the AMRs.

The process 700 may proceed with adjusting, by a controller of a leader AMR, movement characteristics for convoy operation, as at 714. For example, based on the received instructions to form a convoy with one or more other AMRs and based on a determination that the AMRs have completed formation of the convoy, the leader AMR may modify one or more movement characteristics in order to lead the convoy. In some example embodiments, the AMRs may communicate with each other to confirm formation of the convoy. In other example embodiments, the AMRs may individually communicate with a control system to confirm formation of the convoy. Then, the control system may determine that the convoy formation is complete, and may provide an indication to one or more AMRs that the convoy formation is complete. In still other example embodiments, various combinations of communications between AMRs and communications with a control system may be used to confirm completion of convoy formation.

As described herein, the one or more movement characteristics may include modifying speed, stopping, accelerating, decelerating, changing direction, turning, adjusting a path, rerouting, maintaining defined separation distances, and/or other modifications to movement characteristics. In some example embodiments, a leader AMR may maintain or increase speed to lead the convoy. In addition, a leader AMR may change direction or reroute in order to lead the convoy of AMRs along a particular path toward one or more destinations. Moreover, a leader AMR may make smooth or gradual changes to speed, acceleration, direction, or other movement characteristics to lead the convoy. Further, the controller of the leader AMR may adjust the movement characteristics of the leader AMR to lead the convoy.

The process 700 may then continue by adjusting, by a controller of a follower AMR, movement characteristics for convoy operation, as at 716. For example, based on the received instructions to form a convoy with one or more other AMRs and based on a determination that the AMRs have completed formation of the convoy, the follower AMR may modify one or more movement characteristics in order to travel with the convoy. As described above, various communications between AMRs, communications with a control system, and/or combinations thereof may be used to confirm completion of convoy formation.

As described herein, the one or more movement characteristics may include modifying speed, stopping, accelerating, decelerating, changing direction, turning, adjusting a path, rerouting, maintaining defined separation distances, and/or other modifications to movement characteristics. In some example embodiments, a follower AMR may maintain or increase speed to move with the convoy. In addition, a follower AMR may change direction or reroute in order to move with the convoy of AMRs along a particular path toward one or more destinations. Moreover, a follower AMR may maintain a defined separation distance with a forward AMR, and/or a rearward AMR, of the convoy, e.g., based on various characteristics of the AMRs, in order to prevent contact or impact between the AMRs. Further, the controller of the follower AMR may adjust the movement characteristics of the follower AMR to move with the convoy.

The process 700 may then proceed with the convoy operation process, as at 800. For example, the two or more AMRs that have formed a convoy may continue operations as the convoy with the determined movement characteristics. Further details of the convoy operation process 800 are described herein at least with respect to FIG. 8.

The process 700 may then end, as at 718.

Figure 8:
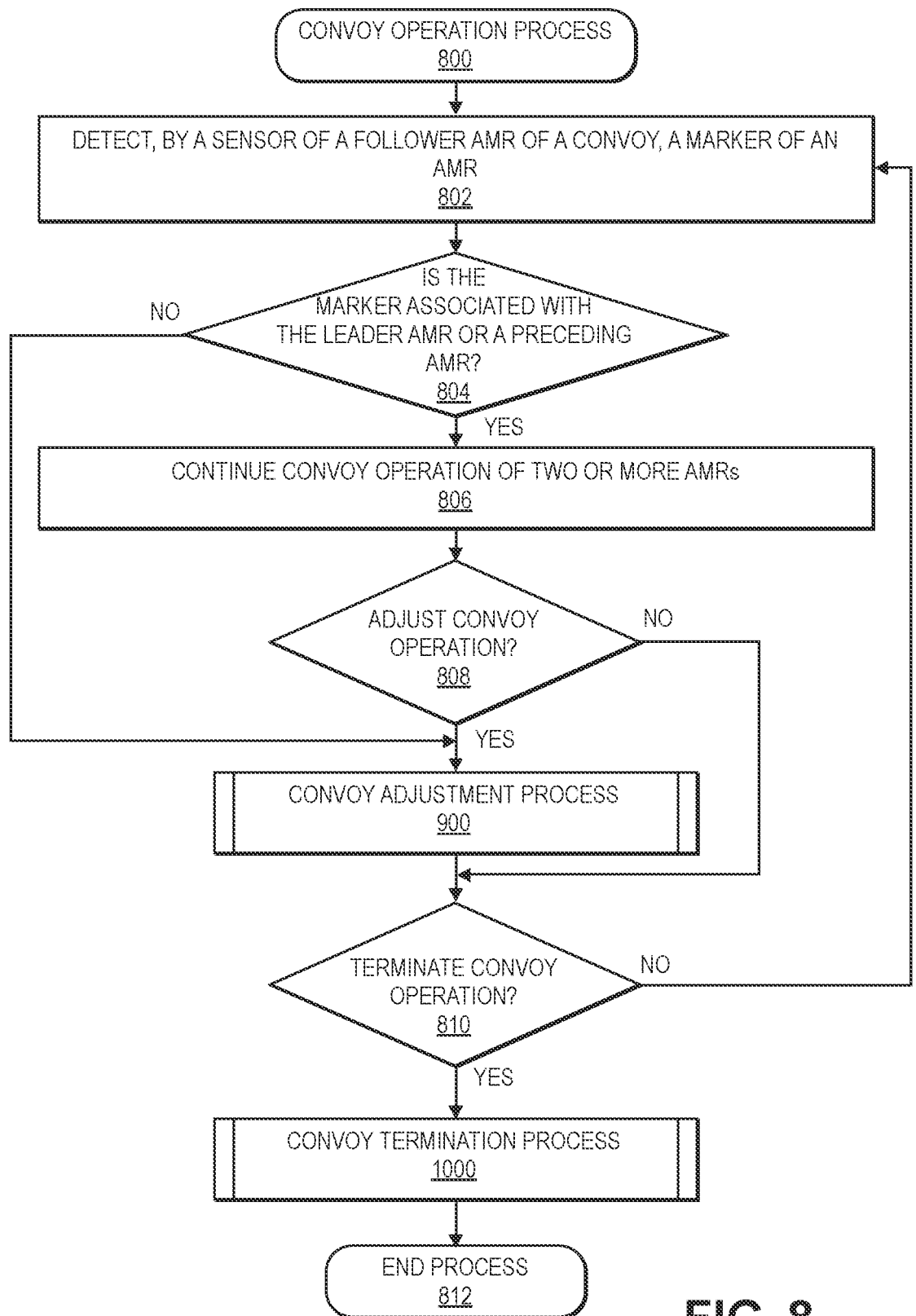
FIG. 8 is a flow diagram illustrating an example convoy operation process, in accordance with implementations of the present disclosure.

FIG. 8 is a flow diagram illustrating an example convoy operation process 800, in accordance with implementations of the present disclosure.

The process 800 may begin by detecting, by a sensor of a follower AMR of a convoy, a marker of an AMR, as at 802. For example, for each follower AMR of a convoy, one or more sensors of a follower AMR may detect an identifier or code positioned on or near a rearward portion of a leader or preceding AMR that the follower AMR is following as part of the convoy. As described herein, the one or more sensors may detect the identifier of the leader or preceding AMR at a higher sampling rate or frequency, in order to ensure that the identifier of the leader or preceding AMR continues to be detected, such that the selective muting and convoy operations should continue. Further, the controller of the follower AMR may receive and process the data detected by the one or more sensors to identify an identifier or code associated with an AMR.

The process 800 may continue by determining whether the marker is associated with a leader AMR or a preceding AMR, as at 804. For example, the identifier or code detected by the one or more sensors of a follower AMR may be identified. Then, the detected identifier may be compared with data associated with an expected identifier or code of the leader or preceding AMR that the follower AMR is following as part of the convoy. Further, the controller of the follower AMR may identify and compare the detected identifier with the expected identifier of the leader or preceding AMR that the follower AMR is following as part of the convoy. If the detected identifier does not match the expected identifier that the follower AMR is to identify and follow, then the process 800 may skip to step 900 to adjust convoy operations for the follower AMR, e.g., to remove or separate the follower AMR from the convoy. Further details of the convoy adjustment process 900 are described herein at least with respect to FIG. 9.

If, however, the detected identifier does match the expected identifier that the follower AMR is following as part of the convoy, then the process 800 may proceed by continuing convoy operation of the two or more AMRs, as at 806. For example, the follower AMR and other AMRs of the convoy may continue traveling together as a group or line of AMRs toward one or more destinations, e.g., with defined separation distances among AMRs. In addition, the follower AMR or other AMRs of the convoy may modify one or more movement characteristics during convoy operations, e.g., modify speed, acceleration, direction, or other characteristics to continue traveling toward one or more destinations. Further, the controller of the follower AMR may maintain or adjust the movement characteristics of the follower AMR to move with the convoy.

The process 800 may then continue to determine whether the convoy operation is to be adjusted, as at 808. For example, in addition to modifications to movement characteristics while traveling as a convoy to one or more destinations as described herein, various other adjustments or modifications may be made to the convoy operation. In example embodiments, one or more new AMRs may be added to an existing convoy and then continue operation as a reconfigured or reformed convoy. In other example embodiments, one or more current AMRs may be removed or separated from an existing convoy and then continue operation individually or independently, whereas remaining AMRs of the convoy may continue operation as a reconfigured or reformed convoy. In further example embodiments, one or more AMRs may detect objects, obstacles, or other AMRs and slow or stop to prevent contact or impact with the detected objects, whereas remaining AMRs of the convoy may continue operation as a reconfigured or reformed convoy. Various other types of adjustments or modifications, e.g., additions, subtractions, reordering, reconfiguring, splitting, combining, merging, disbanding, or other modifications, may be made to a convoy of AMRs during its operation, as well as various combinations of different adjustments or modifications. Further, the controllers of the AMRs of the convoy, and/or a control system, may determine whether to adjust the convoy operation.

If it is determined that the convoy operation is to be adjusted, and/or if it is determined at step 804 that the detected identifier does not match the expected identifier that the follower AMR is to identify and follow, then the process 800 may proceed to adjust convoy operations for one or more AMRs, such as the follower AMR, of the convoy. Further details of the convoy adjustment process 900 are described herein at least with respect to FIG. 9.

Following the convoy adjustment process 900, and/or if it is determined at step 808 that the convoy operation is not to be adjusted, then the process 800 may continue with determining whether to terminate convoy operation, as at 810. For example, the convoy operation may be terminated for various reasons, e.g., the convoy has reached the one or more destinations, the convoy has completed the planned path, the destinations or planned path are obstructed, the AMRs of the convoy cannot maintain speed and/or separation distances to continue convoy operation, the expected or projected efficiency of individual operations of AMRs is similar to or exceeds the expected or projected efficiency of convoy operation of the AMRs, and/or various other reasons. Further, the controllers of the AMRs of the convoy, and/or a control system, may determine whether to terminate the convoy operation. If it is determined that the convoy operation is not to be terminated, then the process 800 may return to step 802 to continue to detect identifiers or codes of AMRs of a convoy, and continue convoy operation towards one or more destinations.

If it is determined that the convoy operation is to be terminated, then the process 800 may proceed with terminating convoy operations for the AMRs of the convoy, as at 1000. Further details of the convoy termination process 1000 are described herein at least with respect to FIG. 10.

The process 800 may then end, as at 812.

Figure 9:
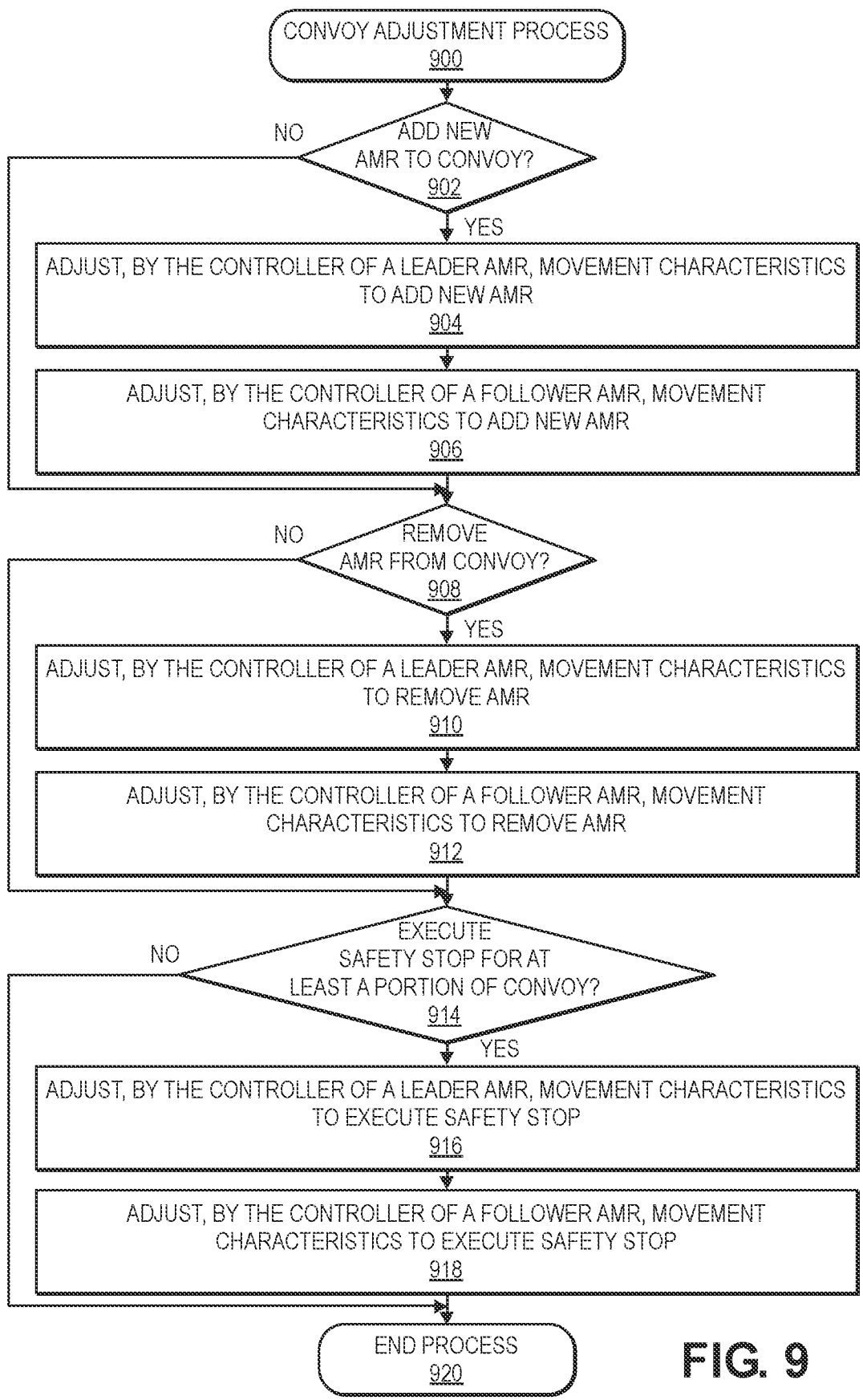
FIG. 9 is a flow diagram illustrating an example convoy adjustment process, in accordance with implementations of the present disclosure.

FIG. 9 is a flow diagram illustrating an example convoy adjustment process 900, in accordance with implementations of the present disclosure.

The process 900 may begin by determining whether to add a new AMR to a convoy, as at 902. For example, a new AMR may be added to an existing convoy of two or more AMRs based on various characteristics of the AMR, characteristics of the existing convoy, and/or characteristics of the facility or environment, which may be similar to the processing or analysis described herein with respect to convoy initiation and/or convoy formation. In addition, a new AMR may be added at various positions or locations with respect to other AMRs of the existing convoy. Further, a control system, and/or controllers of the AMRs of the convoy, may determine whether to add a new AMR to an existing convoy based on the various characteristics of the AMR, existing convoy, and/or the environment.

If it is determined that a new AMR is to be added to a convoy, then the process 900 may continue by adjusting, by the controller of a leader AMR, movement characteristics to add the new AMR, as at 904, and/or by adjusting, by the controller of a follower AMR, movement characteristics to add the new AMR, as at 906.

For example, based on the received instructions to add a new AMR to the existing convoy of AMRs, the leader AMR may modify one or more movement characteristics in order to facilitate adding the new AMR to the convoy, and/or the one or more follower AMRs may modify one or more movement characteristics in order to facilitate adding the new AMR to the convoy. For example, the one or more movement characteristics may include modifying speed, stopping, accelerating, decelerating, changing direction, turning, adjusting a path, rerouting, maintaining or adjusting defined separation distances, and/or other modifications to movement characteristics.

As described herein at least with respect to FIG. 4A, a new AMR may be added as a new leader AMR, such that the new AMR assumes a leading position at a front or lead of a group or line of AMRs, and the previous leader AMR may detect, identify, and follow an identifier associated with the new AMR. Further, the previous leader AMR may selectively mute a portion of a safety zone to permit or allow a portion of the new AMR, and its associated identifier, within the portion of the safety zone, thereby enabling convoy operation. Various modifications to speed, acceleration, direction, separation distances, or other movement characteristics may also be made to facilitate adding the new AMR to the leading position of the existing convoy.

In addition, as described herein at least with respect to FIG. 4B, a new AMR may be added as a new follower AMR, such that the new AMR assumes a following position at a middle of a group or line of AMRs. The new AMR may detect, identify, and follow an identifier associated with a forward AMR from the existing convoy, and a rearward AMR from the existing convoy may detect, identify, and follow an identifier associated with the new AMR. Further, the new AMR may selectively mute a portion of a safety zone to permit or allow a portion of the forward AMR, and its associated identifier, within the portion of the safety zone, and the rearward AMR may selectively mute a portion of a safety zone to permit or allow a portion of the new AMR, and its associated identifier, within the portion of the safety zone, thereby enabling convoy operation. Various modifications to speed, acceleration, direction, separation distances, or other movement characteristics may also be made to facilitate adding the new AMR to the following position of the existing convoy.

Further, as described herein at least with respect to FIG. 4C, a new AMR may be added as a new follower AMR, such that the new AMR assumes a trailing position at an end or rear of a group or line of AMRs. The new AMR may detect, identify, and follow an identifier associated with a forward AMR from the existing convoy. Further, the new AMR may selectively mute a portion of a safety zone to permit or allow a portion of the forward AMR, and its associated identifier, within the portion of the safety zone, thereby enabling convoy operation. Various modifications to speed, acceleration, direction, separation distances, or other movement characteristics may also be made to facilitate adding the new AMR to the trailing position of the existing convoy.

If it is determined that a new AMR is not to be added to a convoy, then the process 900 may proceed by determining whether to remove a current AMR from a convoy, as at 908. For example, a current AMR may be removed from an existing convoy of two or more AMRs based on various characteristics of the AMR, characteristics of the existing convoy, and/or characteristics of the facility or environment, which may be similar to the processing or analysis described herein with respect to convoy initiation and/or convoy formation. In addition, a current AMR may be removed from various positions or locations with respect to other AMRs of the existing convoy. Further, a control system, and/or controllers of the AMRs of the convoy, may determine whether to remove a current AMR from an existing convoy based on the various characteristics of the AMR, existing convoy, and/or the environment.

If it is determined that a current AMR is to be removed from a convoy, then the process 900 may proceed by adjusting, by the controller of a leader AMR, movement characteristics to remove the current AMR, as at 910, and/or by adjusting, by the controller of a follower AMR, movement characteristics to remove the current AMR, as at 912.

For example, based on the received instructions to remove a current AMR from the existing convoy of AMRs, the leader AMR may modify one or more movement characteristics in order to facilitate removing the current AMR from the convoy, and/or the one or more follower AMRs may modify one or more movement characteristics in order to facilitate removing the current AMR from the convoy. For example, the one or more movement characteristics may include modifying speed, stopping, accelerating, decelerating, changing direction, turning, adjusting a path, rerouting, maintaining or adjusting defined separation distances, and/or other modifications to movement characteristics.

As described herein at least with respect to FIG. 5A, a current AMR may be removed from a leading position of the existing convoy, such that the current AMR resumes individual or independent operations. Further, after removal of the current AMR from the leading position, the new leader AMR of the existing convoy may stop selectively muting a portion of a safety zone so that the safety system of the new leader AMR may detect objects, obstacles, and/or other AMRs within the safety zone during convoy operation with the remaining AMRs. Various modifications to speed, acceleration, direction, separation distances, or other movement characteristics may also be made to facilitate removing the current AMR from the leading position of the existing convoy.

In addition, as described herein at least with respect to FIG. 5B, a current AMR may be removed from a following position at a middle of a group or line of AMRs, such that the current AMR resumes individual or independent operations. In addition, the current AMR may stop selectively muting a portion of a safety zone so that the safety system of the current AMR may detect objects, obstacles, and/or other AMRs within the safety zone during individual operations. Further, after removal of the current AMR from the following position, a new leader AMR of a rearward portion of the existing convoy that was following the current AMR may also stop selectively muting a portion of a safety zone so that the safety system of the new leader AMR of the rearward portion of the existing convoy may detect objects, obstacles, and/or other AMRs within the safety zone during convoy operations. Moreover, the forward portion of the existing convoy that the current AMR was following and the rearward portion of the existing convoy that was following the current AMR may reconfigure or reform as a new convoy without the current AMR, and then continue convoy operations with the remaining AMRs. Various modifications to speed, acceleration, direction, separation distances, or other movement characteristics may also be made to facilitate removing the current AMR from the following position of the existing convoy.

Further, as described herein at least with respect to FIG. 5C, a current AMR may be removed from a trailing position at an end or rear of a group or line of AMRs, such that the current AMR resumes individual or independent operations. In addition, the current AMR may stop selectively muting a portion of a safety zone so that the safety system of the current AMR may detect objects, obstacles, and/or other AMRs within the safety zone during individual operations. Further, the remaining AMRs of the existing convoy may continue convoy operations without the current AMR. Various modifications to speed, acceleration, direction, separation distances, or other movement characteristics may also be made to facilitate removing the current AMR from the trailing position of the existing convoy.

If it is determined that a current AMR is not to be removed from a convoy, then the process 900 may proceed by determining whether to execute a safety stop for at least a portion of a convoy, as at 914. For example, one or more AMRs may execute a safety stop, or slow down or reroute, in response to detecting an object, obstacle, and/or other AMR, in order to prevent contact or impact with the detected object. The object may be detected by one or more sensors of the one or more AMRs having respective safety zones around at least a portion of the respective peripheries of the one or more AMRs. Further, a control system, and/or controllers of the AMRs of the convoy, may determine whether to execute a safety stop for one or more AMRs of an existing convoy in response to detecting one or more objects or obstacles by AMRs of the convoy.

If it is determined to execute a safety stop for at least a portion of a convoy, then the process 900 may continue to adjust, by the controller of a leader AMR, movement characteristics to execute the safety stop, as at 916, and/or to adjust, by the controller of a follower AMR, movement characteristics to execute the safety stop, as at 918.

For example, based on the received instructions to execute a safety stop for at least a portion of the existing convoy of AMRs, the leader AMR may modify one or more movement characteristics in order to facilitate stopping at least a portion of the convoy, and/or the one or more follower AMRs may modify one or more movement characteristics in order to facilitate stopping at least a portion of the convoy. For example, the one or more movement characteristics may include modifying speed, stopping, accelerating, decelerating, changing direction, turning, adjusting a path, rerouting, maintaining or adjusting defined separation distances, and/or other modifications to movement characteristics.

As described herein at least with respect to FIG. 3A, a leader AMR at a leading position of a group or line of AMRs may detect an object within a safety zone of the leader AMR. Based on the detected object, the leader AMR may execute a safety stop to prevent contact or impact with the detected object. In addition, the follower AMRs of the convoy may also execute a safety stop to prevent contact or impact with each other. In other example embodiments, the leader AMR may slow and/or reroute around the detected object, and the follower AMRs of the convoy may also slow and/or reroute, and then continue following the leader AMR. In further example embodiments, the leader AMR may stop, and one or more follower AMRs may slow and/or reroute around the leader AMR and detected object, and then continue as a reconfigured convoy with a new leader AMR. In still further example embodiments, various AMRs of the convoy may slow and/or wait for other AMRs of the convoy in order to reform or reconfigure the convoy, and then continue as a reconfigured convoy, which may include a new leader AMR. As described herein, any new leader AMR of a convoy, or any AMR that resumes individual operations, may stop selectively muting a portion of a safety zone so that the safety system of the AMR may detect objects, obstacles, and/or other AMRs within the safety zone during such operations. Various modifications to speed, acceleration, direction, separation distances, or other movement characteristics may also be made to facilitate executing a safety stop by an AMR at a leading position of the existing convoy.

In addition, as described herein at least with respect to FIG. 3B, a follower AMR at a following position at a middle of a group or line of AMRs may detect an object within a safety zone of the follower AMR. Based on the detected object, the follower AMR may execute a safety stop to prevent contact or impact with the detected object. In addition, the rearward AMRs behind the follower AMR of the convoy may also execute a safety stop to prevent contact or impact with each other. The forward AMRs ahead of the follower AMR may continue convoy operations as a shortened or reconfigured convoy. In other example embodiments, the follower AMR may slow and/or reroute around the detected object, and the rearward AMRs of the convoy may also slow and/or reroute, and then continue following the follower AMR, e.g., which may operate as a new leader AMR. In further example embodiments, the follower AMR may stop, and one or more rearward AMRs may slow and/or reroute around the follower AMR and detected object, and then continue as a reconfigured convoy with a new leader AMR. In still further example embodiments, various AMRs of the convoy may slow and/or wait for other AMRs of the convoy in order to reform or reconfigure the convoy, and then continue as a reconfigured convoy, which may include a new leader AMR. As described herein, any new leader AMR of a convoy, or any AMR that resumes individual operations, may stop selectively muting a portion of a safety zone so that the safety system of the AMR may detect objects, obstacles, and/or other AMRs within the safety zone during such operations. Various modifications to speed, acceleration, direction, separation distances, or other movement characteristics may also be made to facilitate executing a safety stop by an AMR at a following position of the existing convoy.

Further, as described herein at least with respect to FIG. 3C, a follower AMR at a trailing position at an end or rear of a group or line of AMRs may detect an object within a safety zone of the follower AMR. Based on the detected object, the follower AMR may execute a safety stop to prevent contact or impact with the detected object. The forward AMRs ahead of the follower AMR may continue convoy operations as a shortened or reconfigured convoy. In other example embodiments, the follower AMR may slow and/or reroute around the detected object, and then continue with individual operations. In further example embodiments, various AMRs of the convoy may slow and/or wait for other AMRs of the convoy in order to reform or reconfigure the convoy, and then continue as a reconfigured convoy, which may include a new leader AMR. As described herein, any new leader AMR of a convoy, or any AMR that resumes individual operations, may stop selectively muting a portion of a safety zone so that the safety system of the AMR may detect objects, obstacles, and/or other AMRs within the safety zone during such operations. Various modifications to speed, acceleration, direction, separation distances, or other movement characteristics may also be made to facilitate executing a safety stop by an AMR at a trailing position of the existing convoy.

The process 900 may then end, as at 920.

Figure 10:
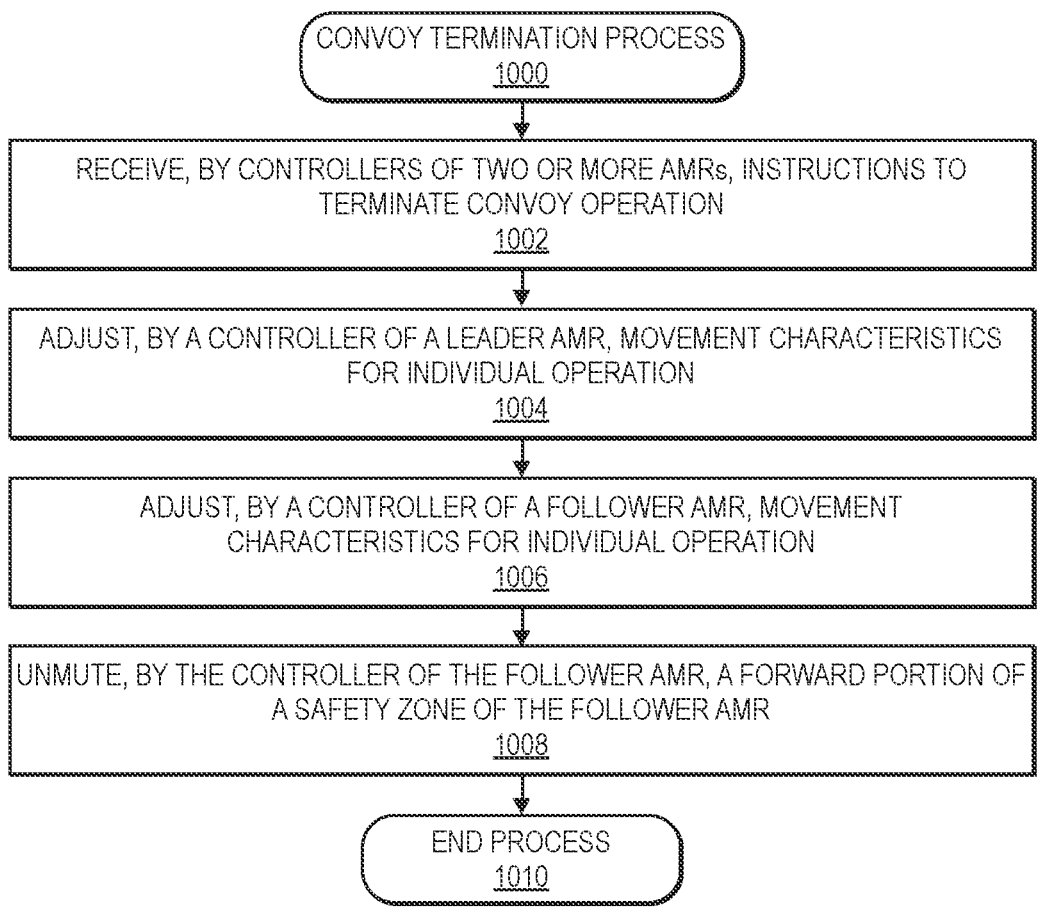
FIG. 10 is a flow diagram illustrating an example convoy termination process, in accordance with implementations of the present disclosure.

FIG. 10 is a flow diagram illustrating an example convoy termination process 1000, in accordance with implementations of the present disclosure.

The process 1000 may begin by receiving, by controllers of two or more AMRs, instructions to terminate convoy operation, as at 1002. For example, as described at least with respect to step 810 of FIG. 8, a control system may have determined that two or more AMRs should terminate operation as a convoy. For example, the convoy operation may be terminated for various reasons, e.g., the convoy has reached the one or more destinations, the convoy has completed the planned path, the destinations or planned path are obstructed, the AMRs of the convoy cannot maintain speed and/or separation distances to continue convoy operation, the expected or projected efficiency of individual operations of AMRs is similar to or exceeds the expected or projected efficiency of convoy operation of the AMRs, and/or various other reasons. Further, a control system, and/or controllers of the AMRs, may instruct or command the controllers of the AMRs of the convoy to terminate the convoy operation.

The process 1000 may then proceed by adjusting, by a controller of a leader AMR, movement characteristics for individual operation, as at 1004. For example, based on the received instructions to terminate a convoy with one or more other AMRs, the leader AMR may modify one or more movement characteristics in order to resume individual operations. In some example embodiments, the AMRs may communicate with each other to confirm termination of the convoy. In other example embodiments, the AMRs may individually communicate with a control system to confirm termination of the convoy. Then, the control system may determine that the convoy termination is complete, and may provide an indication to one or more AMRs that the convoy termination is complete. In still other example embodiments, various combinations of communications between AMRs and communications with a control system may be used to confirm convoy termination.

As described herein, the one or more movement characteristics may include modifying speed, stopping, accelerating, decelerating, changing direction, turning, adjusting a path, rerouting, and/or other modifications to movement characteristics. In example embodiments, a leader AMR may resume safe, individual operations with respect to speed, acceleration, direction, path, or other movement characteristics. Further, the controller of the leader AMR may adjust the movement characteristics of the leader AMR to resume individual operations.

The process 1000 may then continue to adjust, by a controller of a follower AMR, movement characteristics for individual operation, as at 1006. For example, based on the received instructions to terminate a convoy with one or more other AMRs, the follower AMR may modify one or more movement characteristics in order to resume individual operations. As described above, various communications between AMRs, communications with a control system, and/or combinations thereof may be used to confirm completion of convoy termination.

As described herein, the one or more movement characteristics may include modifying speed, stopping, accelerating, decelerating, changing direction, turning, adjusting a path, rerouting, and/or other modifications to movement characteristics. In example embodiments, a follower AMR may resume safe, individual operations with respect to speed, acceleration, direction, path, or other movement characteristics. Further, the controller of the follower AMR may adjust the movement characteristics of the follower AMR to resume individual operations.

The process 1000 may continue by unmuting, by a controller of a follower AMR, a forward portion of a safety zone of the follower AMR, as at 1008. For example, for each follower AMR of a convoy to be terminated, a safety zone of the follower AMR may be unmuted to stop allowing or permitting a portion of another AMR, and its associated identifier, within a portion of the safety zone. The unmuting of the safety zone of the follower AMR may generally return the safety zone associated with the AMR to a size, dimensions, or range associated with safe, individual operations of the AMR. Further, a controller of a follower AMR may instruct a safety system to unmute the safety zone of the follower AMR for individual operations. The process 1000 may then end, as at 1010.

Using the adaptive safety systems in communication with navigation systems as described herein to enable convoy operations, two or more AMRs, e.g., including a leader AMR and one or more follower AMRs, may travel in a group at relatively closer separation distances relative to each other and/or at relatively higher speeds as compared to individual or independent operations of the AMRs. The one or more follower AMRs may substantially continuously or intermittently detect the leader, or a preceding, AMR in order to maintain the convoy operations. In addition, various adjustments may be made to the convoy operations, such as modifying one or more movement characteristics, adding one or more AMRs, removing one or more AMRs, stopping one or more AMRs, and/or various other types of adjustments. Further, the convoy operations of AMRs may improve speed or efficiency of various transport operations within environments, without negatively impacting safety associated with operations of the AMRs in structured or unstructured environments, as well as in proximity to various other types of autonomous robots, robotic devices, automated equipment or machinery, and/or human agents.

In some example embodiments of convoy operations described herein, one or more follower AMRs of a convoy may detect, identify, and follow identifiers associated with leader or preceding AMRs. However, aside from detecting and following the identifier of a forward AMR, the follower AMRs may substantially maintain independent navigation capabilities during convoy operations. Such substantially independent navigation operations may facilitate quick and responsive individual control of AMRs of the convoy, even during convoy operations.

In other example embodiments of convoy operations described herein, one or more follower AMRs of a convoy may detect, identify, and follow identifiers associated with leader or preceding AMRs. And, in addition to detecting and following the identifier of a forward AMR, the follower AMRs may navigate substantially only as followers of forward AMRs, and may not maintain, or maintain only minimal, independent navigation capabilities during convoy operations until the follower AMRs split or separate from the convoy. Such substantially subordinate or dependent operations may prevent spurious or unexpected navigational changes by individual AMRs of the convoy, e.g., due to sensor noise or minor navigational corrections or adjustments.

Furthermore, in some example embodiments, various aspects of convoy operations of AMRs described herein, including initiation, formation, operation, adjustment, termination, and/or other aspects, may be instructed or commanded by one or more controllers of AMRs that may be associated with convoy operations, e.g., leader, follower, trailing, or other AMRs. Further details of an example AMR, or drive unit, control system are described herein at least with respect to FIG. 11. In other example embodiments, various aspects of convoy operations of AMRs described herein may be instructed or commanded by a control system, e.g., a management or material handling control system associated with a facility or environment within which the AMRs are operating. Further details of an example control system are described herein at least with respect to FIG. 12. In further example embodiments, various aspects of convoy operations of AMRs described herein may be instructed or commanded by various combinations of one or more controllers of AMRs and a control system associated with a facility or environment.

For example, various aspects of the convoy initiation process may be substantially instructed or commanded by a control system. In addition, various aspects of the convoy formation process may be substantially instructed or commanded by and among controllers of AMRs. Further, various aspects of the convoy operation process may be substantially instructed or commanded by and among controllers of AMRs. Moreover, various aspects of the convoy adjustment process may be initiated by a control system, and then instructed, commanded, or implemented by and among controllers of AMRs. Furthermore, various aspects of the convoy termination process may be initiated by a control system, and then instructed, commanded, or implemented by and among controllers of AMRs. Various other combinations of control and communication between and among a control system and controllers of AMRs may also be possible.

FIG. 11 is a block diagram illustrating various components of an example autonomous mobile robot (AMR), or drive unit, control system 1100, in accordance with implementations of the present disclosure.

In various examples, the block diagram may be illustrative of one or more aspects of the AMR controller or control system 1100 that may be used to implement the various systems and processes discussed above. In the illustrated implementation, the AMR control system 1100 includes one or more processors 1102, coupled to a non-transitory computer readable storage medium 1120 via an input/output (I/O) interface 1110. The AMR control system 1100 may also include a drive mechanism controller 1104 and a power supply or battery 1106. The AMR control system 1100 may further include a lift mechanism controller 1112, a safety system controller 1113, a navigation system controller 1114, a network interface 1116, and one or more input/output devices 1117.

In various implementations, the AMR control system 1100 may be a uniprocessor system including one processor 1102, or a multiprocessor system including several processors 1102 (e.g., two, four, eight, or another suitable number). The processor(s) 1102 may be any suitable processor capable of executing instructions. For example, in various implementations, the processor(s) 1102 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1102 may commonly, but not necessarily, implement the same ISA.

The non-transitory computer readable storage medium 1120 may be configured to store executable instructions, applications, drivers, and/or data, such as AMR data, identifier or code data, sensor data, safety zone data, separation distance data, detected object data, navigation data, drive mechanism data, path or destination data, movement characteristics data including position, speed, acceleration, weight, load, planned path, destination, or other movement characteristics, lift mechanism data, other sensor data, and/or other data items accessible by the processor(s) 1102. In various implementations, the non-transitory computer readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1120 as program instructions 1122 and data storage 1124. In other implementations, program instructions, applications, drivers, and/or data may be received, sent or stored upon different types of computer-accessible media, such as non-transitory media, or on similar media separate from the non-transitory computer readable storage medium 1120 or the AMR control system 1100.

Generally, a non-transitory, computer readable storage medium may include storage media or memory media such as magnetic or optical media, e.g., disk or CD/DVD-ROM, coupled to the AMR control system 1100 via the I/O interface 1110. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1116.

In one implementation, the I/O interface 1110 may be configured to coordinate I/O traffic between the processor(s) 1102, the non-transitory computer readable storage medium 1120, and any peripheral devices, the network interface 1116 or other peripheral interfaces, such as input/output devices 1117. In some implementations, the I/O interface 1110 may perform any necessary protocol, timing or other data transformations to convert data signals from one component (e.g., non-transitory computer readable storage medium 1120) into a format suitable for use by another component (e.g., processor(s) 1102). In some implementations, the I/O interface 1110 may include support for devices attached through various types of peripheral buses, such as a variant of the Peripheral Component Interconnect (PCI) bus standard or the Universal Serial Bus (USB) standard, for example. In some implementations, the function of the I/O interface 1110 may be split into two or more separate components, such as a north bridge and a south bridge, for example. Also, in some implementations, some or all of the functionality of the I/O interface 1110, such as an interface to the non-transitory computer readable storage medium 1120, may be incorporated directly into the processor(s) 1102.

The drive mechanism controller 1104 may communicate with the processor(s) 1102, the non-transitory computer readable storage medium 1120, the navigation system controller 1114, and/or other components described herein to adjust the operational characteristics of motors or other actuators associated with each drive mechanism to move the AMR along a determined path to a destination and/or to perform other navigational maneuvers or operations, including individual operations and convoy operations.

The AMR control system 1100 may also include a lift mechanism controller 1112 that communicates with the processor(s) 1102, the non-transitory computer readable storage medium 1120, and/or other components described herein to engage, couple, lift, receive, load, move, and/or unload one or more objects, containers, packages, loads, or other items.

The AMR control system 1100 may also include a safety system controller 1113 that communicates with the processor(s) 1102, the non-transitory computer readable storage medium 1120, one or more sensors, the navigation system controller 1114, and/or other components described herein. The safety system controller 1113 may include or be in communication with the one or more sensors, and may determine a safety zone, detect one or more objects within a safety zone, determine whether the one or more objects includes an identifier or code associated with an AMR, compare a detected identifier with an expected identifier associated with an AMR to convoy with, selectively mute a safety zone to enable convoy operations, instruct, modify, and maintain defined separation distances during convoy operations, unmute a safety zone to enable individual operations, and/or various other operations described herein.

The AMR control system 1100 may also include a navigation system controller 1114 that communicates with the processor(s) 1102, the non-transitory computer readable storage medium 1120, the drive mechanism controller 1104, the safety system controller 1113, and/or other components described herein. The navigation system controller 1114 may include or be in communication with one or more position or location determination sensors or systems, such as global positioning system (GPS) sensors, indoor positioning system sensors, or other types of location determination sensors, and may instruct or command movements or modifications of movement characteristics during individual operations, movements or modifications of movement characteristics during convoy operations, movements or modifications of movement characteristics during convoy adjustment operations, movements or modifications of movement characteristics during convoy termination operations, and/or various other operations described herein.

The network interface 1116 may be configured to allow data to be exchanged between the AMR control system 1100, other devices attached to a network, such as other computer systems, control systems, management control systems, controllers or control systems of other AMRs, and/or other vehicles, systems, machines, equipment, apparatuses, systems, sensors, or devices associated with various environments. For example, the network interface 1116 may enable wireless communication between numerous AMRs, and/or between individual AMRs and a control system. In various implementations, the network interface 1116 may support communication via wireless general data networks, such as a Wi-Fi network. For example, the network interface 1116 may support communication via telecommunications networks such as cellular communication networks, satellite networks, and the like.

Input/output devices 1117 may, in some implementations, include one or more visual input/output devices, audio input/output devices, displays, imaging sensors, thermal sensors, infrared sensors, LIDAR, radar, or other time of flight sensors, GPS sensors, indoor positioning system sensors, position encoders, speedometers, inertial measurement units, accelerometers, gyroscopes, weight, load, or pressure sensors, various other sensors described herein, etc. Multiple input/output devices 1117 may be present and controlled by the AMR control system 1100. One or more of these sensors may be utilized to assist in performing the various functions, operations, and processes described herein.

As shown in FIG. 11, the memory may include program instructions 1122 which may be configured to implement the example processes and/or sub-processes described above. The data storage 1124 may include various data stores for maintaining data items that may be provided for performing the various functions, operations, and processes described herein. For example, the data storage 1124 may include AMR data, identifier or code data, sensor data, safety zone data, separation distance data, detected object data, navigation data, drive mechanism data, path or destination data, movement characteristics data including position, speed, acceleration, weight, load, planned path, destination, or other movement characteristics, lift mechanism data, other sensor data, and/or other data items.

Those skilled in the art will appreciate that the AMR control system 1100 is merely illustrative and is not intended to limit the scope of the present disclosure. In particular, the computing system and devices may include any combination of hardware or software that can perform the indicated functions, including other control systems or controllers, computers, network devices, robotic devices, etc. The AMR control system 1100 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

While the above examples have been described with respect to ground based vehicles, the disclosed implementations may also be used for other forms of vehicles, including, but not limited to, aerial vehicles, water based vehicles, or other types of vehicles or autonomous robots.

Figure 12:
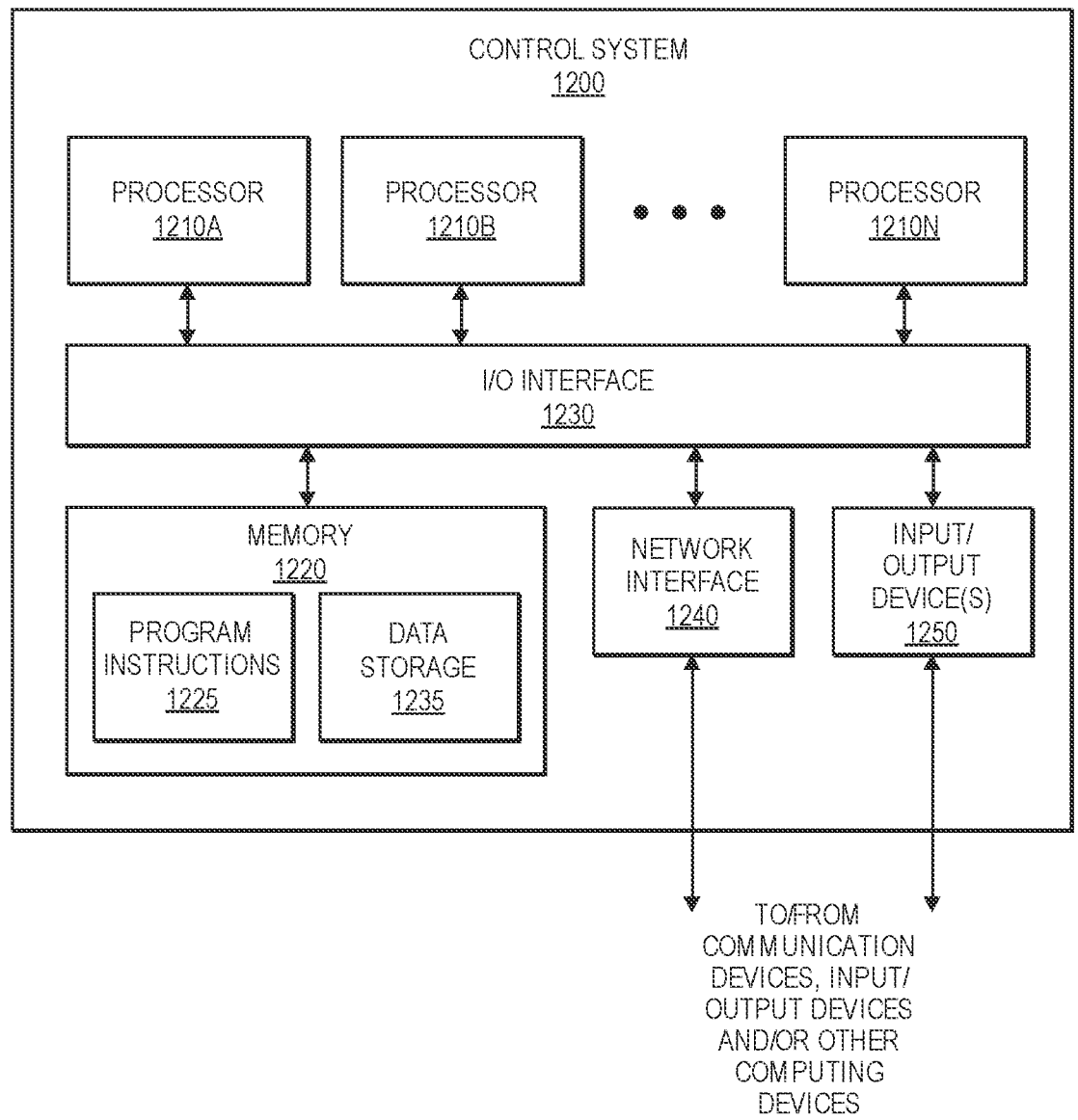
FIG. 12 is a block diagram illustrating various components of an example control system, in accordance with implementations of the present disclosure.

FIG. 12 is a block diagram illustrating various components of an example control system 1200, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 1200. In the illustrated implementation, a control system 1200 includes one or more processors 1210A, 1210B through 1210N, coupled to a non-transitory computer-readable storage medium 1220 via an input/output (I/O) interface 1230. The control system 1200 further includes a network interface 1240 coupled to the I/O interface 1230, and one or more input/output devices 1250. In some implementations, it is contemplated that a described implementation may be implemented using a single instance of the control system 1200 while, in other implementations, multiple such systems or multiple nodes making up the control system 1200 may be configured to host different portions or instances of the described implementations. For example, in one implementation, some data sources or services (e.g., related to portions of AMR adaptive safety systems, operations, or processes to enable convoy operations, etc.) may be implemented via one or more nodes of the control system 1200 that are distinct from those nodes implementing other data sources or services (e.g., related to other portions of AMR adaptive safety systems, operations, or processes to enable convoy operations, etc.).

In various implementations, the control system 1200 may be a uniprocessor system including one processor 1210A, or a multiprocessor system including several processors 1210A-1210N (e.g., two, four, eight, or another suitable number). The processors 1210A-1210N may be any suitable processor capable of executing instructions. For example, in various implementations, the processors 1210A-1210N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1210A-1210N may commonly, but not necessarily, implement the same ISA.

The non-transitory computer-readable storage medium 1220 may be configured to store executable instructions and/or data accessible by the one or more processors 1210A-1210N. In various implementations, the non-transitory computer-readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1220 as program instructions 1225 and data storage 1235, respectively. In other implementations, program instructions and/or data may be received, sent or stored upon different types of computer-accessible media, such as non-transitory media, or on similar media separate from the non-transitory computer-readable storage medium 1220 or the control system 1200. Generally speaking, a non-transitory, computer-readable storage medium may include storage media or memory media such as magnetic or optical media, e.g., disk or CD/DVD-ROM, coupled to the control system 1200 via the I/O interface 1230. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1240.

In one implementation, the I/O interface 1230 may be configured to coordinate I/O traffic between the processors 1210A-1210N, the non-transitory computer-readable storage medium 1220, and any peripheral devices, including the network interface 1240 or other peripheral interfaces, such as input/output devices 1250. In some implementations, the I/O interface 1230 may perform any necessary protocol, timing or other data transformations to convert data signals from one component (e.g., non-transitory computer-readable storage medium 1220) into a format suitable for use by another component (e.g., processors 1210A-1210N). In some implementations, the I/O interface 1230 may include support for devices attached through various types of peripheral buses, such as a variant of the Peripheral Component Interconnect (PCI) bus standard or the Universal Serial Bus (USB) standard, for example. In some implementations, the function of the I/O interface 1230 may be split into two or more separate components, such as a north bridge and a south bridge, for example. Also, in some implementations, some or all of the functionality of the I/O interface 1230, such as an interface to the non-transitory computer-readable storage medium 1220, may be incorporated directly into the processors 1210A-1210N.

The network interface 1240 may be configured to allow data to be exchanged between the control system 1200 and other devices attached to a network, such as other control systems, material handling system controllers, warehouse management systems, other computer systems, robotic or automated arms, machines, equipment, or systems, various types of sensors, upstream stations or processes, downstream stations or processes, other material handling systems or equipment, or between nodes of the control system 1200. In various implementations, the network interface 1240 may support communication via wired or wireless general data networks, such as any suitable type of Ethernet network.

Input/output devices 1250 may, in some implementations, include one or more visual input/output devices, displays, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1200. Multiple input/output devices 1250 may be present in the control system 1200 or may be distributed on various nodes of the control system 1200. In some implementations, similar input/output devices may be separate from the control system 1200 and may interact with one or more nodes of the control system 1200 through a wired or wireless connection, such as over the network interface 1240.

As shown in FIG. 12, the memory 1220 may include program instructions 1225 that may be configured to implement one or more of the described implementations and/or provide data storage 1235, which may comprise various tables, data stores and/or other data structures accessible by the program instructions 1225. The program instructions 1225 may include various executable instructions, programs, or applications to facilitate AMR operations described herein, including individual operations and convoy operations, such as AMR controllers, drivers, or applications, actuator controllers, drivers, or applications, sensor controllers, drivers, or applications, sensor data processing applications, imaging data processing applications, material handling equipment controllers, drivers, or applications, upstream station controllers, drivers, or applications, downstream station controllers, drivers, or applications, etc. The data storage 1235 may include various data stores for maintaining data related to systems, operations, or processes described herein, such as facility or environment data including characteristics of the environment, AMR data, identifier or code data, sensor data, safety zone data, separation distance data, detected object data, navigation data, drive mechanism data, path or destination data, movement characteristics data including position, speed, acceleration, weight, load, planned path, destination, or other movement characteristics, lift mechanism data, other sensor data, material handling equipment or apparatus, upstream systems, stations, or processes, downstream systems, stations, or processes, etc.

Those skilled in the art will appreciate that the control system 1200 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1200 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 6-10, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method to operate autonomous mobile robots (AMRs), comprising:
    receiving, by a first AMR from a control system, an instruction to operate as a leader AMR of a convoy;
    receiving, by a second AMR from the control system, an instruction to operate as a follower AMR of the convoy;
    detecting, by a sensor of the second AMR, an identifier associated with another AMR;
    determining, by a controller of the second AMR, that the detected identifier corresponds to an identifier associated with the first AMR;
    muting, by the controller of the second AMR, at least a portion of a safety zone directly in front of and along a forward movement direction of the second AMR, wherein muting the at least a portion of the safety zone comprises permitting a portion of the first AMR within the safety zone; and
    adjusting, by the controller of the second AMR, at least one movement characteristic of the second AMR to operate as the convoy with the first AMR;
    wherein the portion of the first AMR is positioned within the muted portion of the safety zone directly in front of and along the forward movement direction of the second AMR.

2. The method of claim 1, further comprising:
adjusting, by a controller of the first AMR, at least one movement characteristic of the first AMR based on the instruction to operate as the leader AMR; and
adjusting, by the controller of the second AMR, at least one movement characteristic of the second AMR based on the instruction to operate as the follower AMR.

3. The method of claim 2, wherein adjusting the at least one movement characteristic of the first AMR comprises modifying a speed of the first AMR; and
wherein adjusting the at least one movement characteristic of the second AMR to operate as the follower AMR comprises at least one of following a path of the first AMR or modifying a speed of the second AMR.

4. The method of claim 1, wherein adjusting the at least one movement characteristic of the second AMR to operate as the convoy with the first AMR comprises at least one of matching a speed of the first AMR or maintaining a defined separation distance to the first AMR.

5. The method of claim 1, wherein muting the at least a portion of the safety zone toward the forward movement direction of the second AMR further comprises:
detecting, by the sensor of the second AMR, the identifier associated with the first AMR during operation as the convoy; and
confirming, by the controller of the second AMR, that the detected identifier corresponds to the identifier associated with the first AMR.

6. An autonomous mobile robot (AMR), comprising:
a navigation system;
a safety system in communication with the navigation system, the safety system comprising at least one sensor configured to detect objects within a safety zone of the AMR; and
a controller configured to at least:
detect, via the at least one sensor, an identifier of another AMR;
determine that the detected identifier is an identifier associated with a forward AMR;
mute a portion of the safety zone directly in front of and along a forward movement direction of the AMR, wherein muting the portion of the safety zone comprises permitting at least a portion of the forward AMR within the portion of the safety zone; and
adjust, via the navigation system, at least one movement characteristic of the AMR to convoy with the forward AMR;
wherein at least the portion of the forward AMR is positioned within the muted portion of the safety zone directly in front of and along the forward movement direction of the AMR.

7. The AMR of claim 6, wherein the at least one sensor comprises at least one of an imaging sensor or a light detection and ranging (LIDAR) sensor.

8. The AMR of claim 6, wherein a field of view of the at least one sensor includes a forward movement direction of the AMR.

9. The AMR of claim 6, wherein a size of the safety zone is determined based on at least one of a characteristic associated with the AMR or a characteristic associated with an environment;
wherein the characteristic associated with the AMR comprises at least one of a type, capabilities, position, speed, angular speed, acceleration, angular acceleration, weight, or load associated with the AMR; and
wherein the characteristic associated with the environment comprises at least one of a slope or a surface characteristic associated with a surface within the environment.

10. The AMR of claim 6, further comprising:
an identifier positioned at a rearward portion of the AMR and configured to be detected by at least one sensor of a rearward AMR.

11. The AMR of claim 6, wherein the controller is further configured to at least:
receive, from a control system, an instruction to form a convoy with the forward AMR; and
adjust, via the navigation system, at least one movement characteristic of the AMR by at least one of following a path of the forward AMR or increasing a speed of the AMR.

12. The AMR of claim 6, wherein the controller is further configured to at least:
responsive to determining that the detected identifier is the identifier associated with the forward AMR, adjust, via the navigation system, at least one movement characteristic of the AMR by at least one of matching a speed of the forward AMR or maintaining a defined separation distance to the forward AMR.

13. The AMR of claim 6, wherein muting the portion of the safety zone further comprises:
detecting, via the at least one sensor, the identifier associated with the forward AMR; and
confirming that the detected identifier corresponds to the identifier associated with the forward AMR.

14. The AMR of claim 13, wherein the controller is further configured to at least:
responsive to determining that the detected identifier is not the identifier associated with the forward AMR, adjust, via the navigation system, at least one movement characteristic of the AMR to operate independently from the forward AMR; and
unmute the portion of the safety zone.

15. A method to operate an autonomous mobile robot (AMR), comprising:
receiving, by a controller of the AMR, an instruction to form a convoy with a forward AMR;
adjusting, by the controller and via a navigation system of the AMR, at least one movement characteristic of the AMR to form the convoy with the forward AMR;
detecting, by a safety system of the AMR, an identifier associated with the forward AMR;
muting, by the controller of the AMR, a portion of a safety zone directly in front of and along a forward movement direction of the AMR based on the detected identifier, wherein muting the portion of the safety zone comprises permitting at least a portion of the forward AMR within the portion of the safety zone; and
adjusting, by the controller and via the navigation system of the AMR, at least one movement characteristic of the AMR to operate as the convoy with the forward AMR;
wherein at least the portion of the forward AMR is positioned within the muted portion of the safety zone directly in front of and along the forward movement direction of the AMR.

16. The method of claim 15, further comprising:
receiving, by the controller of the AMR, an instruction to add a new AMR to the convoy; and
adjusting, by the controller and via the navigation system of the AMR, at least one movement characteristic of the AMR to add the new AMR to the convoy at least one of forward or rearward of the AMR.

17. The method of claim 15, further comprising:
receiving, by the controller of the AMR, an instruction to remove a current AMR from the convoy; and
adjusting, by the controller and via the navigation system of the AMR, at least one movement characteristic of the AMR to remove the current AMR from the convoy at least one of forward or rearward of the AMR.

18. The method of claim 15, further comprising:
detecting, by the safety system of the AMR, an object within the safety zone of the AMR; and
adjusting, by the controller and via the navigation system of the AMR, at least one movement characteristic of the AMR to stop based on the detected object.

19. The method of claim 15, further comprising:
receiving, by the controller of the AMR, an instruction to terminate the convoy with the forward AMR;
adjusting, by the controller and via the navigation system of the AMR, at least one movement characteristic of the AMR to terminate the convoy with the forward AMR and operate independently from the forward AMR; and
unmuting, by the controller of the AMR, the portion of the safety zone of the AMR.

\* \* \* \* \*